United States Patent
De Backer et al.

(10) Patent No.: US 11,618,207 B2
(45) Date of Patent: Apr. 4, 2023

(54) SYSTEMS AND METHODS FOR PRINTING 3-DIMENSIONAL OBJECTS FROM THERMOPLASTICS

(71) Applicants: UNIVERSITY OF SOUTH CAROLINA, Columbia, SC (US); TIGHITCO, INC., North Charleston, SC (US)

(72) Inventors: Wout De Backer, Columbia, SC (US); Michael Van Tooren, Elgin, SC (US); Arturs Bergs, Cayce, SC (US)

(73) Assignees: University of South Carolina, Columbia, SC (US); TIGHITCO. Inc., North Charleston, SC (US)

( * ) Notice: Subject to any disclaimer, the term of this patent is extended or adjusted under 35 U.S.C. 154(b) by 134 days.

(21) Appl. No.: 16/538,997

(22) Filed: Aug. 13, 2019

(65) Prior Publication Data
US 2020/0047402 A1 Feb. 13, 2020

Related U.S. Application Data

(60) Provisional application No. 62/828,039, filed on Apr. 2, 2019, provisional application No. 62/815,540, filed
(Continued)

(51) Int. Cl.
*B29C 64/106* (2017.01)
*B29C 64/209* (2017.01)
(Continued)

(52) U.S. Cl.
CPC .......... *B29C 64/106* (2017.08); *B29C 64/209* (2017.08); *B29C 64/241* (2017.08);
(Continued)

(58) Field of Classification Search
CPC ................................................... B29C 64/295
See application file for complete search history.

(56) References Cited

U.S. PATENT DOCUMENTS

| 4,898,527 A | 2/1990 | Claassen et al. |
| 6,113,696 A | 9/2000 | Tseng et al. |
| (Continued) | | |

FOREIGN PATENT DOCUMENTS

| CN | 204431743 | 7/2015 |
| CN | 105172144 | 12/2015 |
| (Continued) | | |

OTHER PUBLICATIONS

International Searching Authority. "International Search Report and Written Opinion" PCT/US2019/046303 (dated Nov. 13, 2019) pp. 1-11.
(Continued)

*Primary Examiner* — Timothy Kennedy
(74) *Attorney, Agent, or Firm* — Dority & Manning, P.A.

(57) ABSTRACT

Embodiments disclosed herein are directed to systems and methods for producing high quality 3-dimensional prints using various materials. Aspects of the present disclosure may provide particular advantages when used with high temperature thermoplastics (such as polyetherimide (PEI) polymers), such as when using continuous fibers impregnated with a high temperature thermoplastic, or when co-depositing a continuous fiber with a formation material containing a high temperature thermoplastic.

12 Claims, 9 Drawing Sheets

Related U.S. Application Data on Mar. 8, 2019, provisional application No. 62/717,941, filed on Aug. 13, 2018.

(51) Int. Cl.

| | |
|---|---|
| *B29C 64/245* | (2017.01) |
| *B29C 64/241* | (2017.01) |
| *B29C 64/364* | (2017.01) |
| *B29C 64/321* | (2017.01) |
| *B29C 64/295* | (2017.01) |

(52) U.S. Cl.
CPC .......... *B29C 64/245* (2017.08); *B29C 64/295* (2017.08); *B29C 64/321* (2017.08); *B29C 64/364* (2017.08)

(56) References Cited

U.S. PATENT DOCUMENTS

| | | | |
|---|---|---|---|
| 6,907,307 | B2 | 6/2005 | Chen et al. |
| 6,942,830 | B2 | 9/2005 | Mülhaupt et al. |
| 7,122,246 | B2 | 10/2006 | Comb et al. |
| 9,211,674 | B2 | 12/2015 | Van Tooren et al. |
| 9,745,452 | B2 | 8/2017 | Hwang et al. |
| 2002/0129485 | A1* | 9/2002 | Mok .............. B29C 64/188 29/527.2 |
| 2009/0014919 | A1 | 1/2009 | Rossfeldt et al. |
| 2009/0273122 | A1 | 11/2009 | Batchelder et al. |
| 2010/0291304 | A1 | 11/2010 | Becker |
| 2013/0073073 | A1* | 3/2013 | Pettis .............. B33Y 30/00 700/119 |
| 2014/0023812 | A1 | 1/2014 | Hammer et al. |
| 2014/0287139 | A1* | 9/2014 | Farmer .............. B29C 64/106 118/695 |
| 2014/0290568 | A1* | 10/2014 | Aoki .............. B05B 7/0075 239/565 |
| 2014/0291886 | A1 | 10/2014 | Mark et al. |
| 2014/0328963 | A1 | 11/2014 | Thomas et al. |
| 2015/0097308 | A1* | 4/2015 | Batchelder .......... B29C 64/393 264/40.6 |
| 2015/0108677 | A1 | 4/2015 | Mark et al. |
| 2015/0298393 | A1 | 10/2015 | Suarez |
| 2016/0177078 | A1 | 6/2016 | Naito et al. |
| 2017/0036403 | A1 | 2/2017 | Ruff et al. |
| 2017/0044337 | A1 | 2/2017 | Van Tooren et al. |
| 2017/0106565 | A1 | 4/2017 | Braley et al. |
| 2017/0129186 | A1* | 5/2017 | Sauti .............. B33Y 50/02 |
| 2017/0136707 | A1 | 5/2017 | Batchelder et al. |
| 2017/0245494 | A1 | 8/2017 | Bardosh et al. |
| 2017/0355142 | A1 | 12/2017 | Sterman et al. |
| 2018/0063895 | A1 | 3/2018 | Van Tooren et al. |
| 2018/0065300 | A1* | 3/2018 | Tyler .............. B33Y 10/00 |
| 2018/0067464 | A1* | 3/2018 | Budge .............. B29C 64/118 |
| 2018/0104922 | A1* | 4/2018 | Busgen .............. B29C 69/02 |
| 2018/0200955 | A1 | 7/2018 | Hoelldorfer et al. |
| 2018/0207866 | A1* | 7/2018 | Tyler .............. B29C 64/209 |
| 2018/0356118 | A1 | 12/2018 | Van Tooren et al. |
| 2019/0202118 | A1* | 7/2019 | Alfson .............. B29C 64/112 |
| 2021/0129456 | A1* | 5/2021 | Inagaki .............. B29C 70/38 |

FOREIGN PATENT DOCUMENTS

| | | |
|---|---|---|
| DE | 10049473 | 5/2001 |
| EP | 1637307 | 3/2006 |
| EP | 3064339 | 9/2016 |
| EP | 3290189 | 3/2018 |
| JP | S 56161259 | 12/1981 |
| KR | 2018/0040555 | 4/2018 |
| KR | 2018/0055425 | 5/2018 |
| WO | WO 2014/153535 | 9/2014 |
| WO | WO 2015/077262 | 5/2015 |
| WO | WO 2015/112998 | 7/2015 |

OTHER PUBLICATIONS

5AXISWORKS. "5AxisMaker" (2017).
Achillas, et al. "A methodological framework for the inclusion of modem additive manufacturing into the production poiffolio of a focused factory" *J. Manufact. Syst.* 37 (2015) pp. 328-339.
Agassant, et al, "Polymer processing extrusion instabilities and methods for their elimination or minimization" *Int'l Polym. Proc.* 21(3) (2006) pp. 239-255.
Ageorges, et al. "Fusion Bonding of Polymer Composites, Engineering Materials and Processes" (2002). ISBN 1-85233-429-0. (Abstract only).
Ahn, et al. "Anisotropic material properties of fused deposition modeling ABS" *Rapid Prototyp. J.* 8(4) (2002) pp. 248-257.
Alexander, et al. "Part orientation and build cost determination in layered manufacturing" *Comp,-Aided Des.* 30(5) (1998) pp. 343-356.
Alhaidri, M.A. "Characterization of carbon-fiber reinforced polyetherimide thermoplastic composites using mechanical and ultrasonic methods" *U. Wisc.-Milw.* (2014) pp. 1-84.
American Machinist. "The CAD/CAM hall of fame" http://americanmachinist.com/cadcam-software/cadcam-hall-fame (1998) pp. 1-3.
Antonov, et at "Anisoprint: Revolutionary 3D printing technology" (2016). http://www.anisoprint.com.
Arevo Labs. "Robotic Additive Manufacturing Platform—Ramp" http://www.arevolabs.com (2015).
ASTM. "D3518—Standard test method for in-plane shear response of polymer matrix composite materials by tensile test of a ±45° laminate" *ASTM Int'l* (2018) pp. 1-7.
Autodesk. "Inventor Professional 3D CAD Software" (2017), https://www.autodesk.com/Inventor.
Beckhoff. TwinCAT—PLC and Motion Control on the PC Beckhoff Automation Technology 3 (2016) https://www.beckhoff.com/twincat/.
Bellini, et al. "Mechanical characterization of parts fabricated using fused deposition modeling" *Rapid Prototyp. J.* 9 (2003) pp. 252-264.
Burtovyy, et al. "Hydrophobic modification of polymer surfaces via "grafting to" approach" *J. Macromolecular Sci. Part B: Physics* 46(1) (2007) pp. 137-154.
Byun, et al. "Determination of the optimal build direction for different rapid prototyping processes using multi-criterion decision making" *Robot. Comp.-Integr. Manufac.* 22(1) (2006) pp. 69-80.
Canellidis, et al. "Efficient parts nesting schemes for improving stereolithography utilization" *Comp.-Aided Des.* 45(5) (2013) pp. 875-886.
Chacón, et al. "Integration of -topology optimized designs into CAD/CAM via an IGES translator" *Struct. Multidisc. Optim.* 50(6) (2014) pp. 1115-1125.
Chakraborty, et al. "Extruder path generation for curved layer fused deposition modeling" *Comp.-Aided Des.* 40 (2008) pp. 235-243.
Cheng, et al. "Multi-objective optimization of part-building orientation in stereolithography" *Rapid Prototyp. J.* 1(4) (1995) pp. 12-23. (Abstract only).
Choi, et al. "A versatile virtualprototyping system for rapid product development" *Comp. Indus.* 59 (2008) pp. 477-488.
Choi, et al. "A multi-material virtual prototyping system" *Comp.-Aided Des.* 37 (2004) pp. 123-136.
Choi, et al, "A virtual prototyping system for rapid product development" *Comp.-Aided Des.* 36 (2003) pp. 401-412.
Cicala, et al. "Engineering thermoplastics for additive manufacturing: a critical perspective with experimental evidence to support functional applications" *J. Appl. Biomater. Funct. Mater.* 15(1) (2017) pp. e10-e18.
Coetzee, G. "Filament thickness sensors: What are they and what are they good for?" *Hackaday* (2016) https://www.hackaday.com.
Conner, et al. "Making sense of 3d printing: Creating a map of additive manufacturing products and services" *Add. Manufact.* 1(4) (2014) pp. 64-76.
Creative Innovation Ltd. "Engineering Plastics" *Innovation Group* (2017). http://www.cil.co.th/engineering-plastics/.
Cupar, et al. "Shape verification of fused deposition modelling 3D prints" *Int'l J. Info. Comp. Sci.* 4 (2015) pp. 1-8.
Dassault Systemés. "Catia" V5-6R2014. https://www.3ds.com/products-services/catia/.

(56) References Cited

OTHER PUBLICATIONS

Dassault Systemés. "Solidworks" https://www.solidworks.com.
De Backer, et al. "Automated reconstniction of continuous robotic motion from G-code patterns" *Proc. CAD* (2016) pp. 316-321.
Dealy, et al. "Melt rheology and its applications in the plastics industry "*Engineering Materials and Processes* (2013) pp. 1-292.
Ding, et al. "Ch. 1—Advanced design for additive manufacturing: 3D slicing and 2D path planning" *New Trends in 3D Printing* (2016) pp. 3-23.
Ding, et al. "A practical path planning methodology for wire and arc additive manufacturing of thin-walled structures" *Robot. Comp.-Integr. Manufact.* 34 (2015) pp. 8-19.
Doherty, et al. "Selective directional reinforcement of structures for multi-axis additive manufacturing" *CAMX Conf. Proc.* (2016) pp. 1-14.
Dolenc, et al. "Slicing procedure for layered manufacturing techniques" *Comp.-Aided Des.* 26 (1994) pp. 119-126.
Donald, et al, "Kinodynamic motion planning" *J. Assoc. Comp. Mach.* 40(5) (1993) pp. 1048-1066.
Draper, et al. "Mixed Polymer Brushes by Sequential Polymer Addition: Anchoring Layer Effect" *Langmuir* 20 (2004) pp. 4064-4075.
E3D-Online. "E3D V6 Hot End" https://www.E3D-online.com/E3D-V6.
E-CFR, "Title 14—Aeronautics and Space" *Office of Federal Register* (2017) pp. 1-1399. https://ecfr.io/Title-14/ (Web only).
Edie, et al. "Thermoplastic coating of carbon fibers" *Clemson University* NASA-CR-185047 (1989) pp. 1-136.
El-Dessouky, et al, "Ultra-lightweight carbon fibre/ thermoplastic composite material using spread tow technology" *Composites Part B: Eng.* 50 (2013) pp. 91-97.
El-Gizawy, et al. "Process-induced properties of FDM products" *Proc. ICMET* (2011) pp. 25-29.
Filastruder. "Filastruder Kit and Filawinder Kit" https://www.filastruder.com
Fitter, et al. "A review on approaches for handling Bézier curves in CAD for manufacturing" *Procedia Eng.* 97 (2014) pp. 1155-1166.
Frank, et al. "Expert system-based selection of the preferred direction of build for rapid prototyping processes" *J. Intell. Manufact.* 6(5) (1995) pp. 3:39-345. (Preview—Abstract only).
Gao, et al. "The status, challenges, and future of additive manufacturing in engineering" *Comp.-Aided Des.* 69 (2015) pp. 65-89.
Gardner et al. "High temperature thermoplastic additive manufacturing using low-cost, open-source hardware" *NASA Langley Research Center* NASA/TM-2016-219344 (2016) pp. 1-15.
GE Plastics. "Ultem® PEI Resin Product Guide" *GE Engineering Thermoplastics* (2015) pp. 1-52.
Geraerts, et al, "A comparative study of probabilistic roadmap planners" *Algor. Found. Robotics V* (2004) pp. 43-58.
Gibson, et al. "Sheet Lamination Processes" *Additive Manufacturing Technologies* (2010) pp. 223-252. (Abstract only).
Giles, et al. "Extrusion: the definitive processing guide and handbook" *William Andrew, Inc.* (2004) pp. 1-560.
Giraud, et al. "Preparation of aqueous dispersion of thermoplastic sizing agent for carbon fiber by emulsion/solvent evaporation" *Appl. Surf. Sci.* 266 (2013) pp. 94-99.
Grutle, Ø.K. "5-axis 3D Printer" *U. Oslo* (2015) pp. 1-114.
Guo, B. "Surface reconstruction: From points to splines" *Comp.-Aided Des.* 9(4) (1997) pp. 269-277. (Abstract only).
Hart, et al. "A formal basis for the heuristic determination of minimum cost paths" *IEEE Trans. Sys. Sci. Cyber.* (1968) pp. 100-107. (Abstract only).
Hayes, et al. "Optical microscopy of fiber-reinforced composites" 05303G *ASM Int'l.* (2010) pp. 1-9.
Henton, et al. "Ch. 16—Polylactic Acid Technology" *Nat. Fibers Biopolym. Biocomp.* (2005) pp. 527-577.
Hexcel. "Hextow® AS4 Carbon Fiber Datasheet" *Hexcel Corp.* (2018) pp. 1-2.
Hou, et al. "Manufacture of a carbon-fabric-reinforced polyetheiimide (CF/PEI) composite material" *Comp. Sci. Techn.* 58(2) (1998) pp. 181-190.
Impossible Objects. "Composite-Based Additive Manufacturing (CBAM) Technology" *Imposs. Obj.* (2017).
Invernizzi, et al. "UV-assisted 3D printing of glass and carbon fiber-reinforced dual-cure polymer composites" *Materials* 9(7):583 (2016) pp. 1-12.
Iyer, et al. "Polystyrene Layers Grafted to Macromolecular Anchoring Layer" *Macromolecules* 36 (2003) pp. 6519-6526.
Izumi International. Composite products. https://www.izumiinternational.com (Web only).
Jamieson, et al. "Direct slicing of CAD models for rapid prototyping" *Rapid Prototyp. J.* 1(1995) pp. 4-12, (Abstract only).
Jia, et al. "Research on the melt impregnation of continuous carbon fiber reinforced nylon 66 composites" *IOP Conf. Ser.: Mater. Sci. Eng.* 137:012053 (2016) pp. 1-14.
Kavraki, et al. "Probabilistic roadmaps for path planning in high-dimensional configuration spaces" *IEEE Trans. Robot. Autom.* 12(4) (1996) pp. 566-580.
Kerbrat, et al. "Manufacturability analysis to combine additive and subtractive processes" *Rapid Prototyp. J.* 16(1) (2010) pp. 63-72.
Kim, et al. "Tool path generation for clean-up machining by a curve-based approach" *Comp. Aided Des.* 37(9) (2005) pp. 967-973.
Koc, et al. "Adaptive ruled layers approximation of STL models and multi-axis machining applications of rapid prototyping" *J. Manuf. Sys.* 21 (2003) pp. 153-166.
Kruth, et al. "Progress in additive manufacturing and rapid prototyping" *Annuals of CIRP* 47(2) (1998) pp. 525-540.
Kuka AG. "Industrial Robotics_Small Robots" *KUKA Robotics Corporation* (2018).
Kuka AG. "Kuka.OfficeLite" *KUKA Robotics Corporation* (2017).
Kuka AG. "Roboter GmbH Controller: KR AGILUS six with W and C Variants Specification" *KUKA Robotics Corporation* (2015) pp. 1-133.
Kuka AG. "Roboter GmbH Controller: KR C4 Operating Instructions" *KUKA Robotics Corporation* (2012) pp. 1-183.
Kuka AG. "Kuka.Sim" *KUKA Robotics Corporation* Ver. 2.2 (2016).
Kuka AG. "Kuka.WorkVisual." *KUKA Robotics Corporation* Ver. 3.2-4.1 (2014).
Kulkarni, et al. "A review of process planning techniques in layered manufacturing" *Rapid Prototyp. J.* 6(1) (2000) pp. 18-35.
Kulkarni, et al. "Deposition strategies and resulting part stiffnesses in fused deposition modeling" *J. Manuf Sci. Eng.* 121(1) (1999) pp. 93-103.
Kulkarni, et al. "An accurate slicing procedure for layered manufacturing" *Comp.-Aided Des.* 28 (1996) pp. 683-697.
Kumar, et al. "Representation and processing of teterogeneous objects for solid freeform fabrication" *Geom. Model. Worksh.* WG5.2 (1998) pp. 1-21.
Lawton, M. "Rotation Sequences and Euler Angles" (1993) pp. 1-7.
Lange, et al. "Analysis of surface roughness using confocal microscopy" *J. Mater. Sci.* 28(14) (1993). pp. 3879-3884.
Lanvalle, et al. "Rapidly-exploring random trees: Progress and prospects" *Algor. Comp. Rob.* (2000) pp. 303-307.
Lehong, et al. "Hype Cycle for Emerging Technologies, 2012" *Gartner* (2012) (Abstract only).
Li, et al. "Fabrication of paper-based microfluidic sensors by printing" *Coll. Surf. B: Biointerfaces* 76(2) (2010) pp. 564-570.
Lin, et al. "Automatic generation of NC cutter path from massive data points" *Comp.-Aided Des.* 30(1) (1998) pp. 77-90.
Liu, et al. "An approximation method to circular arcs" *Appl. Math. Comp.* 219(3) (2012) pp. 1306-1311.
Liu, et al. "Polymer Grafting via ATRP Initiated from Macroinitiator Synthesized on Surface" *Langmuir* 20 (2004) pp. 6710-6718.
Liu, et al. "Synthesis of High-Density Grafted Polymer Layers with Thickness and Grafting Density Gradients" *Langmuir* 21 (2005) pp. 11806-11813.
Local Motors. "Local Motors Strati 3D Printed Car" *Int'l Manufact. Techn. Show* (2014).
Luzinov, I. "Nanofabrication of thin polymer films" *Nanofibers and Nanotechnology in Textiles* Woodhead Publishing Ltd. (2007) pp. 448-469.

(56) References Cited

OTHER PUBLICATIONS

Luzinov, et al. "Responsive brush layers: From tailored gradients to reversibly assembled nanoparticles" *Soft Matter* 4(4) (2008) pp. 714-725.
Ma, et al. "NURBS-based adaptive slicing for efficient rapid prototyping" *Comp.-Aided Des.* 36 (2004) pp. 1309-1325.
Maker's Tool Works. "MendelMax 3" *Maker's Tool Works, LLC* (2015).
Mangual, et al. "Acoustic-Emission-Based Characterization of Corrosion Damage in Cracked Concrete with Prestressing Strand" *ACI Mater. J.* 110(1) (2013) pp. 89-98.
Manufacturing Institute. "Manufacturing's Multiplier Effect is Stronger than Other Sectors" (2014).
Markforged. "Mark Two Desktop 3D Printer" *MarkForged* (2015).
Martínez, et al. "Comparative between FEM models for FDM parts and their approach to a real mechanical behavior" *Procedia Eng.* 63 (2013) pp. 878-884.
Masood, et al. "A generic algorithm for a best part orientation system for complex parts in rapid prototyping" *J. Mater. Proc. Techn.* 139(1) (2003) pp. 110-116.
Mastercam. "Mastercam for Solidworks Solutions" *CNC Software, Inc.* www.mastercam.com.
Materialise. "Materialise Magics" http://www.materialise.com.
Matsuzaki, et al. "Three-dimensional printing of continuous-fiber composites by in-nozzle impregnation" *Sci. Rep.* 6:23058 (2016) pp. 1-7.
Matweb, LLC. *Database of Material Property Data* http://www.matweb.com (Web only).
Miaris, et al. "Continuous impregnation of carbon-fibre rovings" *JEC Comp.* 56 (2010) pp. 75-76.
Molitch-Hou, M. "A new spin on 3D printing weaves objects without supports" engineering.com (2016) pp. 1-3.
Mori, et al. "Dieless forming of carbon fibre reinforced plastic parts using 3D printer" *Procedia Eng.* 81 (2014) pp. 1595-1600.
Moroni, et al. "Functionality-based part orientation for additive manufacturing" *Procedia CIRP* 36 (2015) pp. 217-222.
Neacsu, et al. "Spontaneous radial capillary impregnation across a bank of aligned micro-cylinders. Pail I: Theory and model development" *Int'l J. Multiph. Flow* 32(6) (2006) pp. 661-676.
Neacsu, et al. "Spontaneous radical capillary impregnation across a bank of aligned micro-cylinders. Part Ii: Experimental investigations" *Int'l J. Mutltiph. Flow* 32(6) (2006) pp. 677-691.
Nelaturi, et al. "Representation and analysis of additively manufactured parts" *Comp.Aided Des.* 67 (2015) pp. 13-23.
Ning, et al. "Additive manufacturing; of carbon fiber-reinforced plastic composites using fused deposition modeling: Effects of process parameters on tensile properties" *J. Comp. Mater.* 51(4) (2017) pp. 451-462.
Nohara, et al. "Processing of high performance composites based on peek by aqueous suspension prepregging" *Mater. Res.* 13 (2010) pp. 245-252.
Novikov, et al. "Mataerial: a radically new 3D printing method" http://www.mataerial.com/.
Noztek. "Nortek xcalibur" https://www.noztek.com.
Offringa, et al. "Butt-joined, Thermoplastic Stiffened-skin Concept Development" *Sampe J.*48(2) (2012) pp. 7-15.
Olhoft, et al. "On CAD-integrated structural topology and design optimization" *Comp. Meth. Appl. Mech. Eng.* 89 (1991) pp. 259-279.
Owen-Hill, A. "What's the Difference Between Offline Programming and Simulation?" *RoboDK: Simulation and OLP for Robots* (2017) pp. 1-5.
Padhye, et al. "Multi-objective optimisation and multi-criteria decision making in SLS using evolutionary approaches" *Rapid Prototyp. J.* 17(6) (2011) pp. 458-478.
Pandey, et al. "Real time adaptive slicing for fused deposition modeling" *Mach. Tools Manuf.* 43 (2003) pp. 61-71.
Park, et al. "Tool path generation for a surface model with defects" *Comp. Indust.* 61(1) (2010) pp. 75-82.
Park, et al. "Tool-path generation from measured data" *Comp.-Aided Des.* 35(5) (2003) pp. 467-475.
Pham, et al. "Pan orientation in stereolithography" *Int'l J. Adv. Manuf. Techn.* 15(9) (1999) pp. 674-682.
Phm, et al. "A comparison of rapid prototyping technologies" *Int'l J. Mach. Tools Manuf.* 38 (1998) pp. 1257-1287.
Ponche, et al. "Ch. 11—A new global approach to design for additive manufacturing" *Additive Manuf. Handbook* (2012) pp. 170-186.
Popescu, et al. "Direct tool-path generation based on graph theory for milling roughing" *Procedia CIRP* 25 (2014) pp. 75-80.
Python Software Foundation. "Python 2.7" https://www.python.org (Web only).
Ramachandran, et al. "Mayavi: 3D Visualization of Scientific Data" *IEEE Comp. Sci. Eng.* 13(2) (2011) pp. 40-51.
Ren, et al. "Clean-up tool path generation by contraction tool method for machining complex polyhedral models" *Comp. Ind.* 54(1) (2004) pp. 17-33.
Repetier. "BoXZY Rapid-Change FabLab Firmware" https://www.repetier.com (Web only).
Rieder, et al. "Offline monitoring of additive manufacturing processes using ultrasound" *Euro. Conf. Non-Festr. Test.* (2014) pp. 1-8. (Abstract only).
Roboris. "Eureka Virtual Machining" https://www.roboris.it (Web only).
Rosen, D.W. "Computer-aided design for additive manufacturing of cellular structures" *Comp-Aided Des. Appl.* 4(5) (2013) pp. 585-594.
Russell, et al. "American makes: the National Additive Manufacturing Innovation Institute (NAMII) Status Report and Future Opportunities" *SAMPE J.* 50 (2014) pp. 62-65.
Sabic. "ULEM™ Resin 1000" (2015).
Sabic, "ULEM™ Resin 9085" (2015).
Sánchez, et al. "A single-query bi-directionalprobabilistic roadmap planner with lazy collision checking" *Robot. Res.* (2003) pp. 403-417.
Sellamani, et al. "PCS: Prominent cross-sections for mesh models" *Comp.-Aided Des. Appl.* 7(4) (2010) pp. 1-20.
Shi, et al. "Manufacturability analysis for additive manufacturing using a novel feature recognition technique" *Comp.-Aided Des. Appl.* 15(6) (2018) pp. 941-952, (Abstract only).
SIMPLIFY3D. "Simplify3D 3D Printing Slicing Software" (2017) pp. 1-5.
Singamneni, et al. "Modeling and evaluation of curved layer fused deposition" *J. Mater. Proc. Tech.* 212 (2012) pp. 27-35.
Singamneni, et al. "Curved-layer fused deposition modelling" *J. New Gener. Sci.* 8(2) (2010) pp. 95-107.
Sinotech, Inc. *Injection molded parts, process and equipment.* https://www.sinotech.com (Web only).
SLIC3R. "Slic3r g-code generator for 3D printers" http://www.slic3r.org (Web only).
Smitel et al. "Structural characteristics of fused deposition modeling polycarbonate material" *Polym. Test.* 32(8) (201:3) pp. 1306-1312.
Sobieszczanski-Sobieski, et al. "Multidisciplinary aerospace design optimization: Survey on recent developments" *Struct. Optim.* 14 (1997) pp. 1-23.
Stentz, A. "Optimal and efficient path planning for partially-known eiwironmems" *Proc. IEEE Int'l Conf Robot. Autom.* ( 1994) pp. 3310-3317.
Stevenson, K. "Can ENOMOTO's Experimental 5-Axis 3D Printer Hybrid Do the Impossible?" *Fabbaloo* (2016) pp. 1-2.
Stratasys. *3D printing and additive manufacturing.* http://www.stratasys.com (Web only).
Subrahmanyaivi, et al. "An overview of automatic feature recognition techniques for computer-aided process planning" *Comp. Indust.* 26(1) (1995) pp. 1-21.
Sugavaneswaran, et al. "Analytical and experimental investigation on elastic modulus of reinforced additive manufactured structures" *Mater. Des.* 66 (2015) pp. 29-36.
Sutherland, S.E. "Sketchpad, A man-machine graphical conimunication system" *Mass. Instit. Techn.* (1963) pp. 1-177.

(56) References Cited

OTHER PUBLICATIONS

Talagani, et al, "Numerical simulation of big area additive manufacturing (3D printing) of a full size car" *SAMPE J.* 51(4) (2015) pp. 27-34.
Tang, et al. "Integration of topology and shape optimization for design of structural components" *Struct. Multidiscipl. Optim.* 22 (2001) pp. 65-82.
Tang, et al. "A review of methods for improving the interfacial adhesion between carbon fiber and polymer matrix" *Polym. Comp.* 18(1) (1997) pp. 100-113.
Taylor, et al. "Inkjet printing of carbon supported platinum 3-D catalyst layers for use in fuel cells" *J. Power Sources* 171(1) (2007) pp. 101-106.
Tencate. "Toray Cetex® TC1000 Premium PEI" *Toray Adv. Comp.* (2017) pp. 1-4.
Tuttle, et al. "Feature recognition for NC part programming" *Comp. Indust.* 35(3) (1998) pp. 275-289.
Ullman, D.G. "The Mechanical Design Process" *McGraw-Hill* (2010) pp. 1-450.
Ultimaker. "Cura 3D Printing Slicing Software" Ver. 2.5. (2017) pp. 1-2.
Van Haste, F. "Stop black specks!" *Plastics Techn.* (2007) pp. 1-3.
Vaárudy, et al. "Special issue: Reverse engineering of geometric models" *Comp.-Aided Des.* 29(4) (1997) pp. 253-268.
Vega, et al. "The effect of layer orientation on the mechanical properties and microstructure of a polymer" *J. Mater. Eng. Perf.* 20 (2011) pp. 978-988.
Vélez-García, et al. "Sample preparation and image acquisition using optical-reflective microscopy in the measurement of fiber orientation in thermoplastic composites" *J. Micro.* 248(1) (2012) pp. 23-33.
Vlachopoulos, et al. "The role of rheology in polymer extrusion" *New Techn. Extrus. Conf.* (2003) pp. 20-21.
Wang, et al. "A model research for prototype warp deformation in the FDM process" *Int'l J. Adv. Manuf. Tech.* 33 (2007) pp. 1087-1096.
Weiss, et al. "Low-cost closed-loop control of a 3D printer gantry" *Rapid Prototyp. J.* 21(5) (2015) pp. 482-490.
West, D.M. "What happens if robots -take the jobs? the impact of emerging technologies on employment and public policy" *Centre Techn. Innov. Brookings* (2015) pp. 1-22.
West, et al. "A process -planning method for improving build performance in stereolithography" *Comp.-Aided Des.* 33(1) (2001) pp. 65-79.
Wheeler, A. "GE Aviation's First 3D Printed Engine Component for the GE 90 Engine" *engineering.com* (2015) pp. 1-2.
Wohlers, et al. "Wohlers Report 2016: History of additive manufacturing" *Wohlers Associates, Inc.* (2016) pp. 1-38.
Wong, et al. "A review of additive manufacturing" *ISRN Mech. Eng.* 2012:208760 (2012) pp. 1-10.
Wu, et al. "Implementation of CL points preprocessing methodology with NURBS curve fitting technique for high-speed machining" *Comp. Indust. Eng.* 81 (2015) pp. 58-.64.
Wu, et al. "Analysis on machined feature recognition techniques based on B-rep" *Comp.-Aided Des.* 28(8) (1996) pp. 603-616.

Xu, et al. "Considerations and selection of optimal orientation for different rapid prototyping systems" *Rapid Prototyp. J.* 5(2) (1999) pp. 54-60. (Abstract only).
Xue, et al. "Mechanistic Fatigue Modeling for Continuous Fiber-Reinforced Polymer Matrix Composites" *Int 'l SAMPE Tech. Conf.* (2013) pp. 801-812. (Abstract only).
Yan, et al. "A review of rapid prototyping technologies and systems" *Comp.-Aided Des.* 28 (1996) pp. 307-318.
Young, W.B. "Capillary impregnation into cylinder banks" *J. Coll. Interf. Sci.* 273 (2004) pp. 576-580.
Zdyrko, et al. "Nano-patterning with polymer brushes via solvent-assisted polymer grafting" *Soft Matter* 4 (2008) pp. 2213-2219.
Zdyrko, et al. "Synthesis and Surface Morphology of High-Density Poly(ethylene glycol) Grafted Layers" *Langmuir* 19(24) (2003) pp. 10179-10187.
Zdyrko, et al. "Polymer Brushes by the 'Grafting to' Method" *Macromolecular Rapid Commun.* 32(12) (2011) pp. 859-869.
Zhang, et al. "A Facet Cluster-based Method for Build Orientation Optimization Problem in Additive Manufacturing" *Proc. Ann. Int'l Sol. Freeform Fabr. Symp.* (2016).
Zhang, et al. "A Facet Cluster-based Method for Build Orientation Generation in Additive Manufacturing" *Proc. Ann. Int'l Sol. Freeform Fabr. Symp.* (2016) pp. 23-35.
Zhang, et al. "Build Orientation Determination for Multi-material Deposition Additive Manufacturing with Continuous Fibers" *Procedia CIRP* 50 (2016) pp. 414-419.
Zhang, et al. "Feature based building orientation optimization for additive manufacturing" *Rapid Prototyp. J.* 22(2) (2016) pp. 358-376. (Abstract only).
Zhang, et al. "Build orientation optimization for multi-part production in additive manufacturing" *J. Intell. Manufact.* (2015) pp. 1-15.
Zhang, et al. "Evaluating the design for additive manufacturing—a process planning perspective" *Procedia CIRP* 21 (2014) pp. 144-150.
Zhang, et al. "An integrated decision-making model for multi-attributes decision-making (MADM) problems in additive manufacturing process planning" *Rapid Prototyp. J.* 20(5) (2014) pp. 377-389. (Abstract only).
Zhang, et al. "Using AM feature and multi-attribute decision making to orientate part in additive manufacturing" *High Val. Manuf.: Adv. Res. Virt. Rap. Prototyp.* (2013) pp. 411-416.
Zhong, et al. "Short fiber reinforced composites fused deposition modeling" *Mater. Sci. Eng.* A301 (2001) pp. 125-130.
Zhoushan Howly Screw Co., LTD. Available screw geometries. www.howlyscrew.com (Web only).
Zhuang, et al. "Topology optimization of multi-material for the heat conduction problem based on the level set method" *Eng. Optim.* 42 (2010) pp. 811-831.
Ziemian, et al. "Tensile and fatigue behavior of layered acrylonitrile butadiene styrene" *Rapid Prototyp. J.* 21(3) (2015) pp. 270-278, (Abstract only).
Zuo et al. "A simple and compact python code for complex 3D topology optimization" *Adv. Eng. Softw.* 85 (2015) pp. 1-11.
EPO. "Extended European Search Report" *Eur. Patent Off.* 19849851.1 (dated Mar. 28, 2022) pp. 1-11.

\* cited by examiner

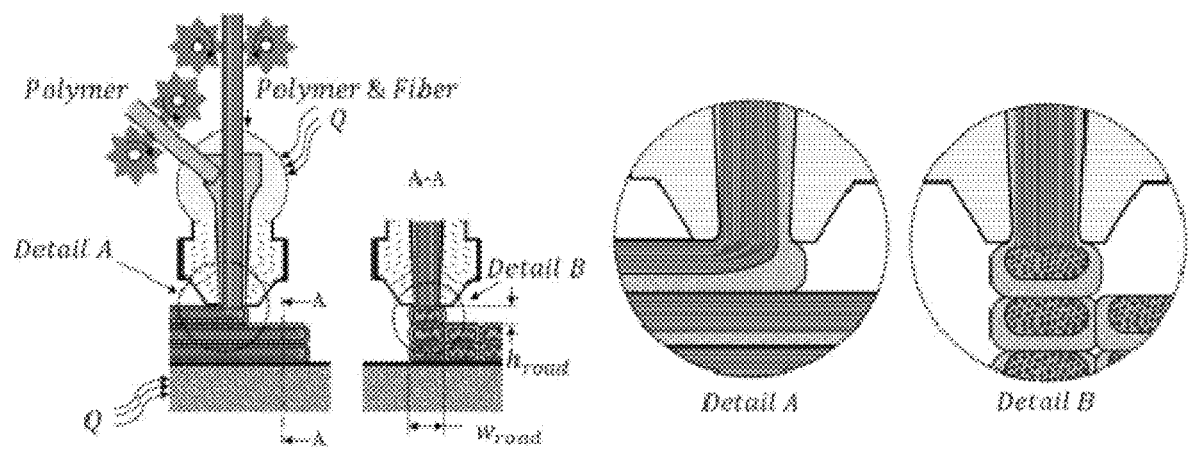
FIG. 7A
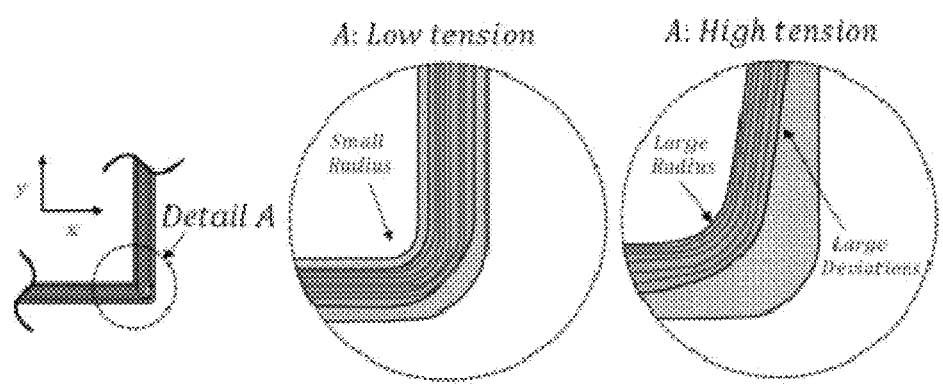
FIG. 7B
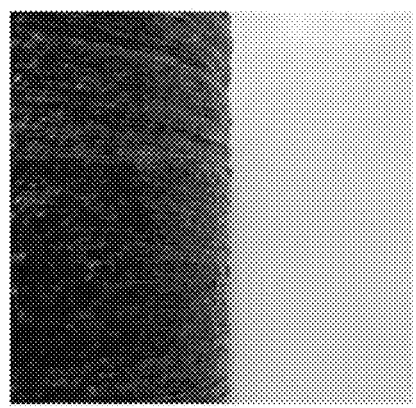 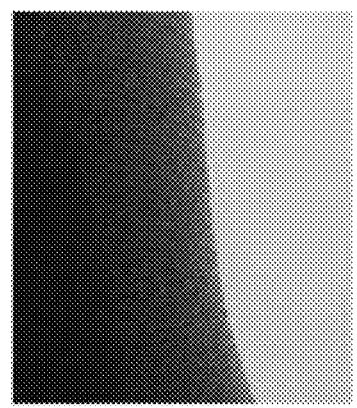
FIG. 7C  FIG. 7D

SYSTEMS AND METHODS FOR PRINTING 3-DIMENSIONAL OBJECTS FROM THERMOPLASTICS

CROSS-REFERENCE TO RELATED APPLICATIONS

This application claims the benefit of U.S. Provisional Application Nos. 62/717,941, filed Aug. 13, 2018; 62/815,540, filed Mar. 8, 2019; and 62/828,039, filed Apr. 2, 2019, the contents of each of which are hereby incorporated by reference.

BACKGROUND

Additive manufacturing refers to any method for forming a three-dimensional ("3D") object in which successive layers of material are laid down according to a controlled deposition and solidification process. The main differences between additive manufacturing processes are the types of materials to be deposited and the way the materials are deposited and solidified. Fused deposition modeling (also commonly referred to as 3D printing) extrudes materials including liquids (e.g., polymeric melts or gels) and extrudable solids (e.g., clays or ceramics) to produce a layer, followed by spontaneous or controlled curing of the extrudate in the desired pattern of the structure layer. Other additive manufacturing processes deposit solids in the form of powders or thin films, followed by the application of energy and/or binders often in a focused pattern to join the deposited solids and form a single, solid structure having the desired shape. Generally, each layer is individually treated to solidify the deposited material prior to deposition of the succeeding layer, with each successive layer becoming adhered to the previous layer during the solidification process.

While additive manufacturing technologies have become more common and less expensive in recent years, the technology is primarily limited to formation of prototypes, as the formed materials generally exhibit low strength characteristics. Attempts have been made to form higher strength composite structures, for instance by combining a high crystalline polymer with a lower crystalline polymer in a fused deposition process. While such attempts have provided some improvement in the art, room for further improvement exists. For instance, the characteristics of highly crystalline polymers are still less than what is desirable in many high strength applications.

Still needed is an understanding of the 3D printing process to advance the development of systems that can implement high temperature and high strength materials without sacrificing the quality of the 3D printed object.

SUMMARY OF THE INVENTION

Embodiments disclosed herein are directed to systems and methods for producing high quality 3-dimensional prints using various materials. Aspects of the present disclosure may provide particular advantages when used with high temperature thermoplastics such as polyetherimide (PEI) polymers, such as when using continuous fibers impregnated with a high temperature thermoplastic and/or when co-depositing a continuous fiber with a formation material containing a high temperature thermoplastic.

In an example embodiment, a system for printing a three-dimensional object can include: a print head, a print bed, a heating and cooling implement; and a controller. As an example implementation, the heating and cooling implement can be in communication with a portion of the print bed, such that the heating and cooling implement can provide heating or cooling to adjust the bed temperature to between about 0° C. to about 105° C.

In certain embodiments, the system for printing a three-dimensional object can also include an arm and the arm can include a rotatable joint and a rotatable connection. In these embodiments the arm can be in communication with the print head such that movements by the arm in a direction may cause the print head to move in a corresponding direction to adjust the placement of print material on the print bed. In some embodiments, the arm may further include a feeding system, the feeding system comprising a reel containing a continuous fiber and a fiber pathway. In an example implementation, the fiber pathway can include one or more rotors configured to advance the continuous fiber to the print head. In some embodiments, the feeding system may also include one or more sensors that can be configured to measure a tension for a portion of the continuous fiber and/or the forces at the print head.

For embodiments of the disclosure, the print bed can include a bed material and a bed coating positioned on a printing surface of the print bed. In an example implementation, the printing surface includes a surface upon which material can deposited by the system. In some embodiments, the bed coating can include a polymer. Several non-limiting examples of polymers that can be used as a bed coating include an acrylic, Teflon™ (polytetrafluoroethylene), a polyethyleneimine, or combinations thereof. Additionally, in some embodiments, the bed material may include a ceramic. Several non-limiting examples of a ceramic that can be used as a bed material include a silica, an alumina, or a combination thereof. In an example implementation, the silica can include borosilicate glass.

Alternatively, or additionally, the bed material can include a metal or alloy. Several non-limiting examples of the metal or alloy can include aluminum, titanium, tungsten, iron, steel, or combinations thereof.

Generally, the bed temperature can be heated or cooled to achieve a range of temperatures. For example, certain embodiments of the disclosure can achieve a bed temperature between about 0° C. to about 150° C. In some implementations, the bed temperature can be between about 50° C. to about 90° C. For embodiments of the disclosure, the system for printing a three-dimensional object may also include a heating and cooling element to adjust the temperature of material on the bed surface in addition to controlling the bed temperature.

In an example implementation, certain embodiments may include one or more infra-red heaters positioned above the print bed. The one or more infra-red heaters may transmit focused thermal energy to material that has been deposited on the print bed to improve bonding between layers and so can provide improved structural benefits.

As another example embodiment of the disclosure, a method for 3D printing an object from a high-melt material (e.g., a high temperature thermoplastic) can include: feeding the high-melt material to a system for printing a three-dimensional object (e.g., systems disclosed herein); depositing the high-melt material on a print bed heated to a build temperature; cooling the print bed to a removal temperature; and removing the object from the print bed. In an example implementation, the print bed can include a bed material and a bed coating applied to a surface of the bed material. In certain implementations, advantages or improvements in depositing material onto the bed surface or removing a 3D printed object from the bed surface can be achieved by a temperature difference between the glass transition temperature of the bed coating and the glass transition temperature of the high-melt material (e.g., the temperature difference can be about 80° C. to about 120° C.). Alternatively, or additionally, advantages or improvements may be achieved by a difference in the coefficient of thermal expansion.

In an example implementation, the build temperature can be between about 75° C. and about 140° C. In certain implementations, the build temperature can be between about 85° C. and about 120° C. In some implementations, the build temperature can be between about 90° C. and about 110° C.

In another example implementation, the removal temperature can be between about 0° C. and about 70° C. In certain implementations, the removal temperature is between about 30° C. and about 65° C. In some implementations, the removal temperature can be between about 50° C. and about 60° C.

In certain embodiments, the method for 3D printing an object from a high melt material can include a set of operations for depositing a first layer in contact with the print bed and a set of operations for depositing one or more subsequent layers above or in contact with the first layer. In an example implementation, the set of operations for depositing the first layer can include depositing a first layer comprising the high-melt material on a print bed and heating the print bed to a build temperature. The set of operations for depositing one or more subsequent layers can include providing thermal energy to a region of the first layer or a region of a subsequent layer using a heat source (e.g., an infra-red heater) and depositing a subsequent layer on the region of the first layer or the region of the subsequent layer. In this manner, the methods may include steps to induce melting or glass transition in a region of a previously deposited layer (e.g., the first layer or any subsequent layer) to improve bonding for the deposition of a subsequent layer. As a non-limiting example, a method for 3D printing an object from a high melt material can include feeding the high melt material to a system for printing a three-dimensional object, depositing a first layer on a print bed heated to a build temperature, depositing a first subsequent layer on the first layer, heating a region of the first subsequent layer, and depositing a second subsequent layer on the region of the first subsequent layer. For certain materials having higher glass transition temperatures, heating a region of a previously deposited layer may improve bonding, especially for subsequent layers that are not in contact with the print bed.

In an additional example embodiment, a system for printing a three-dimensional object from a formation material can include: a print head having a liquefier and a nozzle; a tension monitor configured to measure tension of a fiber prior to the fiber entering the print head; a force sensor configured to measure pressure at the nozzle; a print bed; a heating and cooling implement; and a controller. As an example implementation, the heating and cooling implement can be in communication with a portion of the print bed and configured to provide temperature control to adjust a bed temperature to between about 0° C. to about 105° C. For these embodiments, at any time after depositing the first layer, the print bed may be allowed to cool or actively cooled to reach a removal temperature be between about 0° C. and about 70° C.

In certain implementations, the liquefier can include a structure positioned prior to the nozzle, the structure including a shell having an exterior surface and a void surrounded by an interior surface, and a feed line connecting the exterior surface and the interior surface. As an example to further illustrate the structure, the void can go along an axis of the shell and can be configured to allow the fiber to enter the void and exit the void. Additionally, the feed line may include a space for providing the formation material to the void. In some implementations, the interior surface can also include a coating. In certain applications, it may be preferable for the coating to include a low friction substance and that the low friction substance have a decomposition temperature higher than the glass transition temperature of the formation material. Several non-limiting examples of the low friction substance can include tungsten disulfide, titanium nitride, or both.

In some embodiments, the structure can also include an input guide positioned at or prior to where the fiber enters the void. As an example implementation, the input guide can be reversibly connected to the structure such that the input guide can be swapped or removed from the structure to accommodate different sized or shaped fibers. In general, the reversible connection should not otherwise damage the liquefier upon removal, which can allow for several different input guides to be used with the same liquefier. The different input guides, in an example aspect, can be differentiated by their cross section which may be adjusted to accommodate continuous fibers having different characteristics such as diameters, fiber sizes or shapes (e.g., tapes) so that the interaction with a formation material in the liquefier does not cause the fiber to bunch or bundle. Interaction of the continuous fiber and the formation material at the liquefier can cause defects that the addition of an input guide can resolve to maintain fiber orientation. For certain applications, ensuring the production of a low-defect or no defect object is important to the mechanical properties of the object, and further to expanding 3D printing technology to applications beyond producing prototypes.

For certain embodiments, the system can also include a heating jacket positioned to substantially surround the liquefier or a portion of the liquefier (e.g., the void, the feed line, or both). In these embodiments, generally the heating jacket is configured to provide heat to the formation material in the liquefier to adjust the flow characteristics of the formation material as it moves through the liquefier.

In example embodiments of the disclosure, the tension monitor can also be configured to lower the tension in the continuous fiber (which can be visually identified by the presence of a bend) prior to the fiber entering the print head. In certain implementations, lowering the tension (e.g., inducing a bend) can be accomplished by the tension monitor performing or signaling the system to perform one or more operations such as increasing a fiber feed rate based on absence of a bend in the continuous fiber upstream of the print head and decreasing a deposition rate based on absence of the bend. In some embodiments, the tension monitor may also be configured to perform the opposite operation such as decreasing a fiber feed rate based on presence of a bend in the continuous fiber upstream of the print head and increasing a deposition rate based on presence of the bend. As an example implementation, the tension monitor can include an encoder and/or a light sensor for detecting the presence of a bend.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIGS. 7A-7D illustrates example embodiments of the disclosure depicting aspects of the fiber position within deposited composite material at high or low tension. FIG. 7A shows a drawing of any example print system including details of cross-sections for print material deposited on a print bed. FIG. 7B shows a drawing of a curve or bend depicting fiber position at low tension or high tension. FIGS. 7C and 7D provide photographic images of fibers produced according to example systems and methods of the disclosure at higher tension (7C) or lower tension (7D).

FIG. 9A illustrates a profile view and FIG. 9B illustrates a front view.

Figure 1:
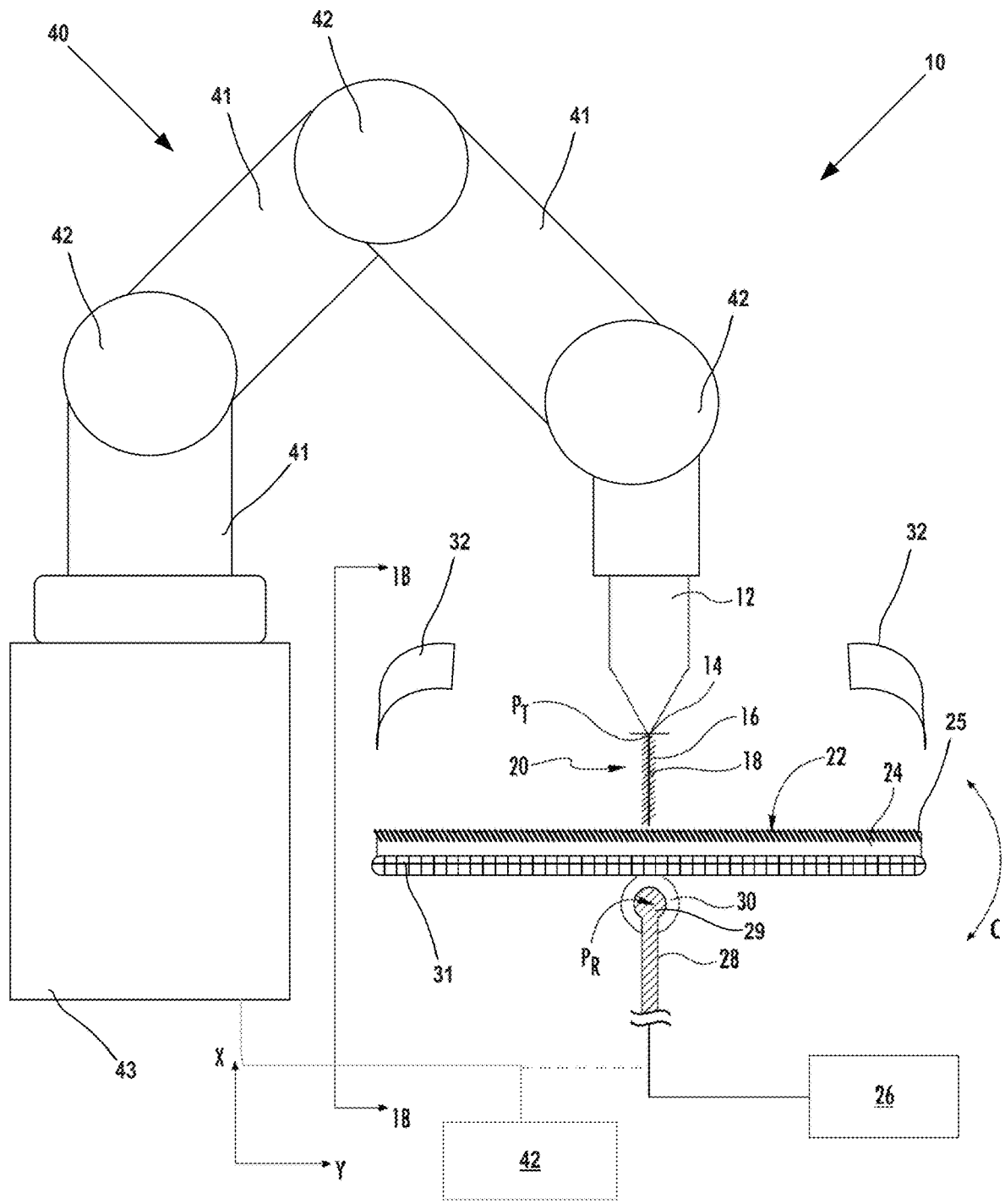
FIG. 1 illustrates an example embodiment of the disclosure depicting an example system for printing a 3D object.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

In general, embodiments disclosed herein are directed to systems and methods for producing high quality 3-dimensional prints using various materials. Aspects of the present disclosure may provide particular advantages when used with high temperature thermoplastics such as polyetherimide (PEI) polymers, such as when using continuous fibers impregnated with a high temperature thermoplastic or when co-depositing a continuous fiber with a formation material containing a high temperature thermoplastic.

Several example high temperature thermoplastics can include, without limitation, amorphous thermoplastics such as polysulfone (PSU), poly(ethersulfone) (PES), and polyetherimide (PEI), as well as semi-crystalline thermoplastics such as poly(phenylene sulfide) (PPS); polyaryl ether ketones (PAEK) including polyether ketones (PEK) and polyetheretherketone (PEEK); partly aromatic polyamides such as polyphthalamide (PPA); liquid-crystalline polymers (LCP); and polyphenylene sulfones (PPSU), as well as blends and copolymers of thermoplastics.

Further examples of polymers that can be included in the formation material include, without limitation, epoxy resins, silicone resins, polyimides, phenolformaldehyde resin, diallyl phthalate, as well as combinations of materials.

In a particular embodiment, the high temperature thermoplastic can exhibit a high glass transition temperature ($T_g$). For instance, a thermoplastic polymer having a glass transition temperature of about 150° C. or greater can be included as the high temperature thermoplastic. Exemplary high $T_g$ polymers can include, without limitation, polyethyleneimine ($T_g$=215° C.), PEI ($T_g$=217° C.), polyamide-imide ($T_g$=275° C.), polyarylate ($T_g$=190° C.), PES ($T_g$=210° C.-230° C.), polyimide ($T_g$=250° C.-340° C.), polyphenylene ($T_g$=158° C.-168° C.), and amorphous thermoplastic polyimide ($T_g$=247° C.). Other examples of high $T_g$ polymers include those that contain one or more of the following monomers (listed along with a published $T_g$ for the homopolymer): 2-vinyl naphthalene ($T_g$=151° C.), 2,4,6-trimethylstyrene ($T_g$=162° C.), 2,6-dichlorostyrene ($T_g$=167° C.), vinyl carbazole ($T_g$=227° C.), vinyl ferrocene ($T_g$=189° C.); acenaphthalene ($T_g$=214° C.), and methacrylic acid anhydride ($T_g$=159° C.).

Embodiments of the disclosure can include a system for printing a three-dimensional (3D) object, the system including a print head, a print bed, a heating a cooling implement in communication with the print bed, and a controller. In these embodiments, the heating and cooling implement can provide heating or cooling to adjust the temperature of the print bed to about −10° C. to about 150° C. For applications involving high-temperature thermoplastics, the ability to control the temperature of the print bed can provide manufacturing improvements that may be used in combination with other embodiments of the disclosure.

In some embodiments, the system for printing a 3D object can also include an arm—the arm including one or more rotatable joints—and one or more rotatable connections. An example aspect of the arm is the ability to communicate actions to the print head. The movements of the rotatable joints or the rotatable connections can be propagated through the arm to the print head, to provide the print head with at least 6 degrees of freedom. The 6 degrees of freedom can provide the print head movement across the entire plane of the print bed, as well as the area above the print bed (i.e., independent movement in the x-direction, the y-direction, and the z-direction). Additionally, the 6 degrees of freedom provide rotational movement including pitch, yaw, and roll that can allow the print head to deposit material at any angle from the print bed or in any direction which can provide improved manufacturing of irregular 3D print objects, or 3D print objects which have very smooth surfaces (e.g., a cylinder or a sphere). In some embodiments, the system can be adapted to deposit material on a form present on the print bed. Again, embodiments of this disclosure can provide improvements or advantages for depositing material on forms that have an irregular and/or smooth shape.

In some embodiments, the system can further include a feeding system. In an example implementation, the feeding system can be included as a component of the arm or included in the arm. For these embodiments, the feeding system can include a reel containing a continuous fiber and a fiber pathway. Generally, the feeding system is configured to provide the continuous fiber to the print head for deposition on the print bed. Example continuous fibers can include an organic fiber or an inorganic fiber. For example, a continuous fiber may include a metal (e.g., copper, steel, aluminum, stainless steel, etc.); basalt; glass (e.g., E-glass, A-glass, C-glass, D-glass, AR-glass, R-glass, S1-glass, S2-glass, etc.); carbon (e.g., amorphous carbon, graphitic carbon, or metal-coated carbon, etc.); nanotubes; boron; ceramics (e.g., boron, alumina, silicon carbide, silicon nitride, zirconia, etc.); aramid (e.g., Kevlar® marketed by E.I. DuPont de Nemours, Wilmington, Del.); synthetic organics (e.g., polyamide, ultra-high molecular weight polyethylene, paraphenylene, terephthalamide, and polyphenylene sulfide); polybenzimidazole (PBI) fibers; and various other natural or synthetic inorganic or organic materials known for forming fibrous reinforcing compositions. The continuous fiber can include materials having a melting temperature greater than the deposition temperature of the additive manufacturing process in which the fiber will be used. In some embodiments, the continuous fiber can include a composite fiber, the composite fiber including one or a combination of the continuous fibers, and further including a polymer that has impregnated at least a portion of the fiber.

In certain embodiments, the continuous fiber can include more than one filament, and/or the composite fiber can include a number of filaments, each filament composed of a single strand of fiber material (e.g., aluminum, amorphous carbon, or other inorganic or organic materials that can be used to form a fiber). In some embodiments the number of filaments can include a filament orientation describing the form or shape of the filaments, such as an array of parallel filaments. In certain embodiments, the one or more filaments can be twisted together. As used herein, the term "roving" may refer to a bundle of generally aligned individual filaments and is used interchangeably with the term "tow." The individual filaments contained within the roving can be twisted or can be straight, and the bundle can include individual filaments made from different fiber materials or the same fiber material that can be twisted about one another or generally parallel continuous fibers with no intentional twist to the roving.

Although different filaments can be used in a roving, it can be beneficial in some embodiments to utilize a roving that contains a plurality of a single filament type, for instance to minimize any adverse impact of using filament types having a different thermal coefficient of expansion. The number of filaments contained in a roving can be constant or can vary from one portion of the roving to another and can depend upon the material of the filament. A roving can include, for instance, from about 500 individual filaments to about 100,000 individual filaments, or from about 1,000 individual filaments to about 75,000 individual filaments, and in some embodiments, from about 5,000 individual filaments to about 50,000 individual filaments.

An aspect of the fiber pathway is a mechanism for pulling and/or guiding the continuous fiber as it moves from the reel to the print head. In an example embodiment, the mechanism can include one or more rotors that can move the continuous fiber by fiction between the moving rotor and the continuous fiber. As used herein, a rotor can include any moving implement that can apply unidirectional contact or force to the continuous fiber. In certain embodiments, the feeding system may further include one or more sensors. As an example implementation, the one or more sensors can include a force sensor to measure the tension felt by the continuous fiber as it is being moved through the feeding system (e.g., to determine if the continuous fiber is near its breaking strength). In another implementation, the one or more sensors can include a position sensor that can measure the distance between the print head and the print bed or the distance between the print head and material that has been deposited onto the print bed.

For embodiments of the disclosure, the print bed can include a bed material, the bed material forming the surface upon which material can be deposited by the print system. In an exemplary embodiment, the print bed can further include a bed coating positioned on the printing surface of the print bed, such that material deposited on the print bed would contact the bed coating rather than directly contacting the bed material. Generally, the bed coating can include a polymer such as an acrylate (e.g., poly-methyl-methacrylate), a vinylmer (e.g., polyvinylether), a polyfluoromer (e.g., polytetrafluoroethene), a polyethyleneimine (e.g., ULTEM 1000), or combinations of these. In certain embodiments, a polymer providing a tacky or sticky surface may be preferred to provide adhesion during the deposition of a first layer of a 3D printed object. In some embodiments, a polymer providing a lower stick may be preferred to improve removal of the 3D printed object after deposition. Generally, the systems and methods described herein can provide advantages for producing high-quality 3D printed objects that stick to the print bed but do not adhere so strongly that the 3D printed objects break or warp upon removal.

In embodiments of the disclosure, the bed material can include a durable and/or low-reactivity material such as a ceramic or a metal. In an example implementation, the ceramic can include a silica (e.g., borosilicate glass), an alumina (e.g., aluminum oxide), or a combination (e.g., aluminosilicates). In another example implementation, the metal can include aluminum, titanium, tungsten, iron, steel, or a combination thereof. Since the bed is in contact with a heating and cooling implement, conditions such as the thermal conductivity of the bed material or the thickness of the bed material can be adjusted to adjust the time it takes for a portion of the print bed to reach a temperature which can be beneficial for certain implementations and methods using embodiments of the 3D printing system.

As an example, another embodiment of the disclosure can include a method for 3D printing an object that comprises a high-melt material, the method including: feeding the high-melt material to a system for printing a three-dimensional (3D) object; depositing the high-melt material on a print bed heated to a build temperature; cooling the print bed to a removal temperature; and removing the object from the print bed.

In general, the system for printing a 3D object can include embodiments of the disclosure, as well as variations of embodiments of the disclosure that can accomplish the elements of the methods described. For example, the 3D printing system can include a print head for heating the high-melt material to a deposition temperature and configured to place the heated high-melt material on a portion of the print bed to produce a 3D object. Additionally, the print bed can be heated to the build temperature using a heating and cooling implement in communication with the print bed.

An example aspect of the disclosed methods can include embodiments for printing a 3D object from a material having a glass transition temperature that is different from the glass transition temperature of the bed coating. At least in part because of the temperature difference, example embodiments of the disclosure can provide improved adhesion during deposition while still providing removal without damaging the 3D printed object.

In certain embodiments of the disclosure, the build temperature (which describes the temperature of the print bed) can be between about 75° C. and about 140° C. In an example implementation, the build temperature can be between about 85° C. and about 120° C. In another example implementation, the build temperature can be between about 90° C. and about 110° C. Additionally, or alternatively, in certain embodiments the removal temperature (which describes the temperature of the print bed) can be between about 0° C. and about 70° C. In an example implementation, the removal temperature can be between about 30° C. and about 65° C. In another example implementation, the removal temperature can be between about 50° C. and about 60° C.

In some embodiments, the temperature difference between the bed coating and the material used to form the 3D printed object can be about 90° C. to about 120° C. For instance, the bed coating can have a glass transition temperature of 105° C. and the material to form the 3D printed object can have a glass transition temperature of 217° C. (a temperature difference of about 112° C.). In an example implementation, the temperature difference can be about 95° C. to about 115° C. In another example implementation, the temperature difference can be about 100° C. to about 110° C. Generally, for methods that incorporate a temperature difference between the bed coating and the material used to form the 3D printed object, the glass transition temperature of the material used to form the 3D printed object may be greater than the glass transition temperature of the bed coating. Thus, the temperature difference ($\Delta T$) can be described using a positive number as the difference between the glass transition temperature of the material to form the 3D printed object ($T_{g\_3D}$) and the glass transition temperature of the bed coating ($T_{g\_coat}$) or the difference ($\Delta T = T_{g\_3D} - T_{g\_coat}$)

For embodiments that include a 3D printed object formed from more than one material, the primary material (e.g., the material comprising most of the composition by wt %) in contact with the print bed can be used to determine the glass transition temperature of the material. As an example implementation, the material comprising most of the composition by wt % can define the glass transition temperature. As another example implementation, a weighted average of the glass transition temperatures of each material may be used to define the glass transition temperature of the composition (e.g., A=25 wt %, $T_{g}{}^{A}$=200° C. and B=75 wt %, $T_{g}{}^{B}$=250° C.; define $T_{g}{}^{AB}$=0.25(200° C.)+0.75(250° C.)=237.5° C.). As another example implementation, the glass transition temperature ($T_g$) of the multi-material substance may be determined by a standard method such as differential scanning calorimetry (DSC). Similarly, for embodiments that include multiple polymers in the bed coating, the primary bed coating material (e.g., the bed coating material comprising most of the composition by wt %) can be used to determine the glass transition temperature of the bed coating. Any of the above methods may also be used to determine the glass transition temperature of the bed coating including calculating a weighted average or using a standard method.

The 3D printer, according to an embodiment, utilizes a six (6) Degrees of Freedom (or more, including seven Degrees of Freedom) system that allows the printing of fiber(s) in different directions and orientations relative to a plane perpendicular of a print bed, where in some instances, the fiber is a continuous fiber. Generally, 6 Degrees of Freedom refers to the freedom of movement in three-dimensional space of the print bed onto which the fibers are printed. Specifically, the print bed can have six (6) independently controllably movements—three translational movements and three rotational movements. The translational movements include up/down (z-axis), left/right (y-axis), and forward/backward (x-axis), and the three rotational movements are typically referred to as pitch, roll, and yaw. The print head may be fixed relative to some degrees of freedom, such as up/down, or alternatively also exhibit six degrees of freedom. In some embodiments, added degrees of freedom can be achieved by the introduction of a mandrel on the print bed to which composite material is applied. Orientation of the mandrel itself may be controlled relative to the print bed to provide added degrees of freedom (i.e., 7 Degrees of Freedom).

The various degrees of freedom of the print bed, and in some instances, the movement of an added mandrel, allow for complex introduction of fiber(s) and/or composite materials into and/or above a work piece (e.g., object, part component, and the like) beyond what is achievable by a standard 3D printer. Instead of introduction of a fiber and/or composite material in a stepped-fashion to a work piece, the orientation, elevation, angle, and the like of a fiber(s) and/or composite material may be varied during the printing process to create complex printed formations/shapes within the work piece. For example, the fiber(s) and/or composite material could be applied as the print bed is periodically or continuously altered in direction/orientation to create a complex pattern of fiber(s) and/or composite material, such as for example, a zigzag pattern in the work piece or bend or complex shape in the work piece that cannot be achieved by linear application of material as performed by traditional 3D printers. The continuous fiber(s) or composite material may even be twisted about itself by manipulation of the print bed and/or an alternative mandrel relative to the fiber(s) or composite material during application.

In this disclosure, additional improvements are described that can allow increased control in the printing of 3-dimensional objects from high temperature thermoplastics, such as polyetherimide. Additionally, the printing systems disclosed provide embodiments that can demonstrate improved adhesion of the 3-dimensional object to the print surface, while still allowing for the removal of the 3-dimensional object after printing is complete. Further, certain embodiments can demonstrate improved structural characteristics by integrating additional heat sources that can improve adhesion between layers of deposited material.

FIG. 1 shows an exemplary system 10 including a print head 12 having a nozzle 14 defining a translational point PT. In certain embodiments, the print head 12 can combine a formation material 16 and a continuous fiber 18 to form a composite material 20. In some embodiments, the continuous fiber 18 can be deposited without providing a composite material 20. In any of these embodiments, the continuous fiber 18 can include an impregnated continuous fiber that includes a polymer interspersed through at least a portion of the continuous fiber 18. During printing, the composite material 20 or the continuous fiber 18 can be deposited onto the printing surface 22 of the print bed 24 and/or a mandrel (not shown) located on the printing surface, where the mandrel acts as a structural form to which the composite material is applied, and/or an existing work piece. In some embodiments, the print bed 24 can include a bed coating 25 covering a portion or the entirety of the print bed 24. The print bed 24 can be adjustable, independently with 6 degrees of freedom, as controlled by the controller 26. As will be discussed later, the movement/orientation of an optional mandrel may also be controlled relative to the print bed to provide added degrees of freedom for further complex printing.

The print bed 24 is moveable in the x-direction (i.e., up/down with respect to the translational point PT), in the y-direction (i.e., laterally with respect to the translational point PT), and z-direction (i.e., cross-laterally with respect to the translational point PT). The print bed 24 can be moved in one or more directions, independently, by controller 26 using the bed connection 28 connected to the receiver 30 of the print bed 24. In particular embodiments, the bed connection 28 can be formed from multiple segments connected at moveable joints (bending and/or rotating) to allow for translational movement of the print bed 24 with respect to the translation point PT.

Additionally, the print bed 24 is rotationally movable about the rotational point PR to allow roll (r), pitch (p), and yaw (w) rotational movement. The print bed 24 can be rotated in any direction, independently, by controller 26 using the bed connection 28 connected to the receiver 30 in communication with the print bed 24. Although shown as utilizing a rotation ball 29 coupled to the receiver 30, any suitable connection can be utilized.

In certain embodiments, the 3D printing system 10 can include a control unit 42 in addition to controller 26 or alternatively to controller 26. Control unit 42 can receive computer-readable instructions and transmit the instructions to the 3D printing system 10 or to a component of the 3D printing system 10 (e.g., the arm 40). In an example embodiment, the control unit 42 can receive an instruction for printing a 3D shape, the instruction including a tool path which describes in part a path the print head makes upon executing the instruction. The control unit 42 or the controller 26 can also be in communication with other components of the 3D printing system 10, such as the heating and cooling implement 31. In this manner, the control unit 42 or the controller 26 may execute an action such as initiating heating a portion of the print bed to a temperature or cooling a portion of the print bed to another temperature.

In general, the lines extending from the controller 26 and or the control unit 42 are used to indicate communication with components of the 3D printing system 10. As stated previously, the control unit 42 and/or the controller 26 can receive an instruction and transmit that instruction to a component of the 3D printing system. In an example implementation, the instruction can be received prior to the 3D printing system 10 executing the action.

In an embodiment, the 3D printing system 10 can include an arm 40, the arm 40 including one or more rotatable segments 41 and one or more rotatable connections 42 to control movement of the print head 12 in relation to the print bed 24. In certain embodiments, the rotatable connection 42 can include a ball joint allowing the rotatable connection movement in pitch, yaw, roll, or combinations of these directions. In some embodiments, the rotatable 42 connection can include a ball joint allowing the rotatable connection movement only in pitch, yaw, or both directions. In some embodiments, the rotatable segment 41 can include ball bearings or other mechanical implements that allow the rotatable connection movement in the roll direction. In certain embodiments, the rotatable segment 41 can be static and the movement of the arm 40 can be controlled only by adjusting the rotatable connection 42. Thus, it should be understood that rotatable is used to describe implements that may be configured to provide rotational motion, but that do not need to utilize the rotational motion or that may be configured to be static and provide no rotational motion. Additionally, the rotatable segment 41 and rotatable connection 42 can generally provide rotational motion to any portion of the arm 40 connected therefrom. For example, FIG. 1 shows at least 3 rotatable segments 41 and at least 3 rotatable connections 42. Actions performed by an earlier rotatable segment 41 or earlier rotatable connection 42 (e.g., the rotatable segment 41 extending from a base 43) may be communicated to adjust the position of any rotatable segment 41, rotatable connection 42, and/or print head 12, which are connected in some manner to the earlier rotatable segment 41 or rotatable connection 4.

From the coordinated movement of these rotatable segments and rotatable connections, the print head 12 can adjustably move across the entire plane of the print surface 22 and/or above the plane of the print surface 22 (e.g., on top of an object located on the print surface 22) no matter the orientation of the print bed 24. This degree of control may be advantageous in certain applications that may require the print head 12 to deposit material perpendicular to the print bed 24 or for depositing material on top of irregular surfaces, such as on top of an irregular object placed on top of the print surface 22.

In an embodiment of the disclosure, the print bed 24 can include a bed material and a bed coating 25 applied to the print surface 22. The bed material can include various glasses (e.g., borosilicate glass), metals (e.g., aluminum), resins (e.g., acrylic), or ceramics (e.g., aluminum silicate). The bed coating 25 may be applied in combination with any bed material and can include various polymers or combinations of polymers (e.g., poly methyl methacrylate acrylics, Teflon™ (polytetrafluoroethylene), and polyethyleneimine). Generally, print bed 24 can be any thickness capable of supporting 3D printing. Additionally, in certain embodiments, the print bed 24 can be detachable so that the print bed can be removed and substituted with a different print bed 24.

In another embodiment of the disclosure, the print bed 24 can be in communication with a heating and cooling implement 31. The heating and cooling implement 31 can be configured to control all or a portion of the print bed 24 temperature, for example, by providing heat to increase the temperature of the print bed 24 to a processing temperature of between about 85° C. to about 100° C. Alternatively or additionally, the heating and cooling implement 31 can provide cooling to decrease the temperature of the print bed 24 to a removal temperature of about 70° C. to about room temperature (i.e., 37° C.). To provide heating or cooling to a portion of the print bed 24, the heating and cooling implement 31 may include a grid of regions that each having an undependably controlled temperature. By controlling the temperature of the print bed 24 before, during, or after printing, certain embodiments may yield advantages in printing complex structures, without damaging the structures during removal. In an example implementation, a method for printing a high temperature thermoplastic can include printing a pre-impregnated continuous fiber containing a high temperature thermoplastic, such as ULTEM 10000, which can have a glass transition temperature of about 217° C. During printing, the continuous fiber containing ULTEM 100 can be deposited on a print bed 24 in communication with a heating and cooling implement 31 capable of controlling the temperature of the print bed 24 to a processing temperature of about 90° C. to about 98° C. Once printing is complete, the heating and cooling implement 31 can adjust the temperature of the print bed 24 to a removal temperature of about of about 65° C. to about 55° C.

In some implementations, the 3D printing system can further include one or more IR heating sources 32 positioned to provide heat to a local area of the print surface 22 and/or to a portion on an object (e.g., a 3D print object or a guide) positioned on top of the print surface 22. For certain applications, the IR heating sources 32 may provide an advantage in bonding new composite material 20 or an impregnated continuous fiber to previously extruded composite material (e.g., a 3D printed object). For example, the IR heating sources 32 can improve bonding of newly liquified composite material by heating a 3D printed object to above its glass transition temperature so that the new composite material 20 deposited on top of the 3D printed object can mix, and thereby form an extended semi-crystalline network upon cooling rather than two separate semi-crystalline networks. By extending the semi-crystalline network of the structure, structural properties such as break strength, or the presence of defects can be improved.

Figure 2:
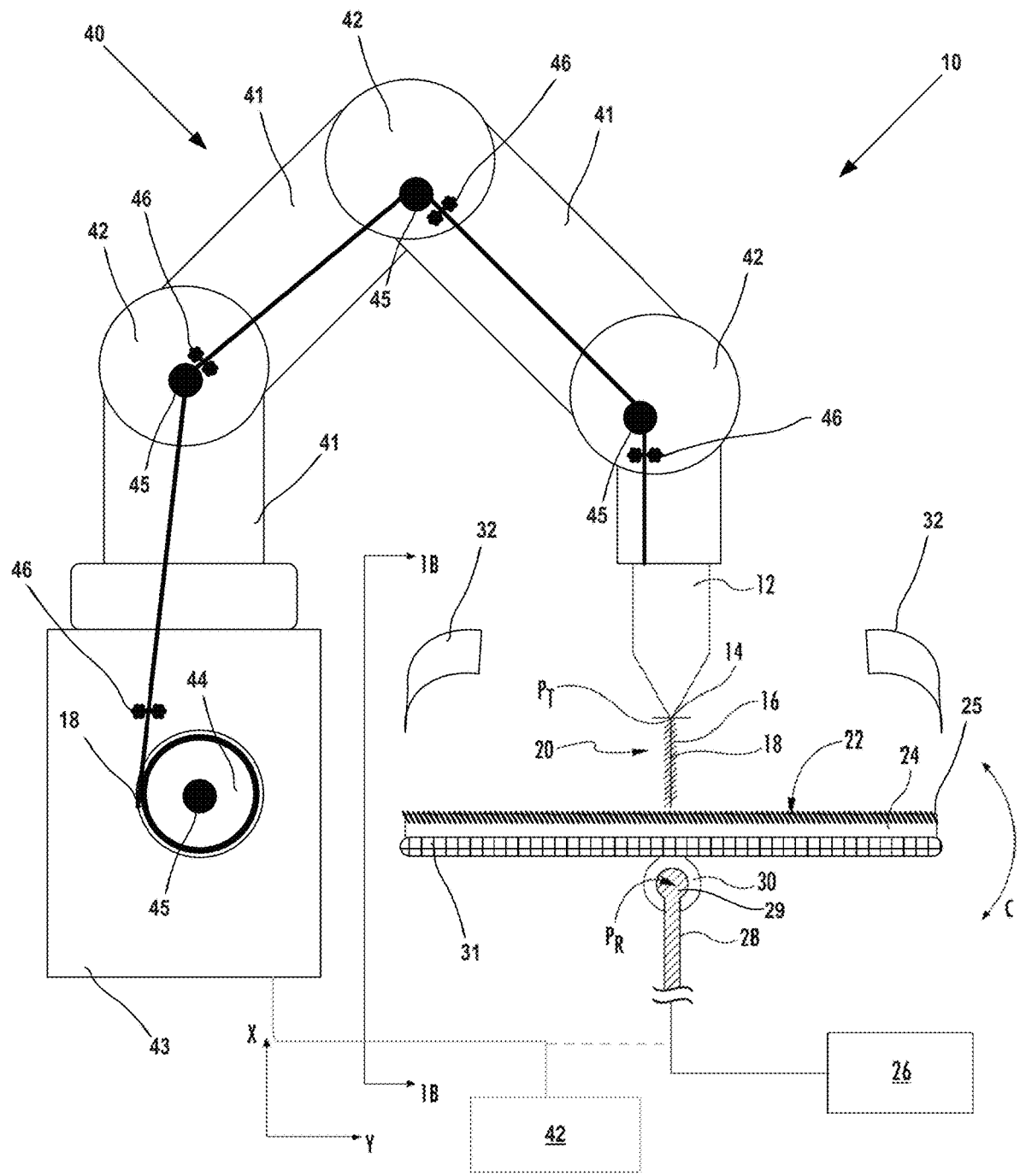
FIG. 2 illustrates an example embodiment of the disclosure depicting another example system for printing a 3D object.

FIG. 2 displays another example system 10 which further shows an example path for a continuous fiber 18 to be fed from a reel 44 to the print head 12 for deposition on the printing surface 22. In an example implementation, the 3D printing system 10 can also include one or more sensors 45 for monitoring factors such as tension of the continuous fiber and/or movement rate of the continuous fiber. As shown in FIG. 2, the feeding system can include a reel 44 containing the continuous fiber 18. The fiber pathway is composed of one or more fiber segments that can be defined as a length between two rollers 46, the rollers 46 providing frictional contact to move the continuous fiber 18 through the fiber pathway.

Figure 3:
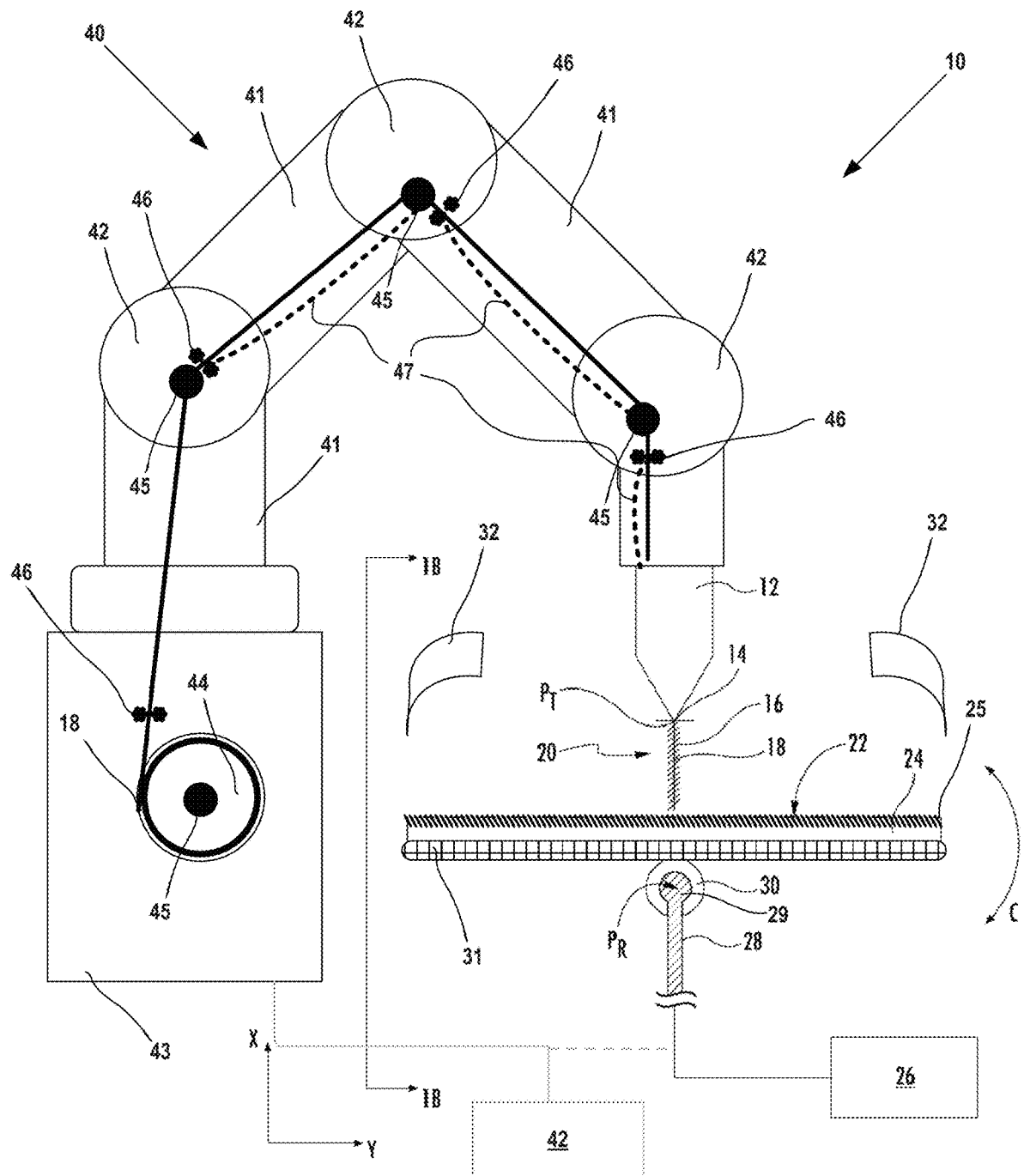
FIG. 3 illustrates an example embodiment of the disclosure depicting another example system for printing a 3D object.

FIG. 3 displays a further example system 10 which further displays an exemplary embodiment of the disclosure including at least one sensor 45 that functions as a tension monitor. Example tension monitors can include a light sensor and/or an encoder which can track or sense whether a bend 47 is present in the line of continuous fiber 18. In example implementations the bend may be present at one or more points prior to the print head 12. An aspect of using the tension monitor to introduce a bend 47 can include the ability to reduce the pulling force on the continuous fiber from print head movement. By dynamically tracking or maintaining the presence of a bend 47, embodiments of the disclosure can print at speeds of about 2 to about 30 mm/sec with a reduced likelihood of fiber breakage due to pulling during deposition. In certain embodiments, print speeds can be achieved between about 4 to about 20 mm/sec. In some embodiments, print speed can be achieved between about 5 to about 15 mm/sec.

Controlling the presence of a bend 47 may be achieved in various ways. Several non-limiting examples of methods to produce a bend 47 can include increasing a fiber feed rate based on absence of the bend and/or decreasing a deposition rate based on absence of the bend. As an example implementation, the fiber feed rate can be increased by passing more continuous fiber 18 from the reel 44 through the fiber pathway to the print head 12. In another example implementation, the deposition rate can be decreased by reducing the rate of depositing material on the print bed.

Generally, modifying the fiber feed rate or the deposition rate can be accomplished by signaling the system using a passive or an active signal. An example of a passive signal includes the control unit 42 and/or the controller 26 including instructions that upon receiving a signal from the system 10, the feed rate and/or the deposition rate are automatically adjusted. Trigger events for the system transmitting a signal can include: a sensor 45 not detecting the presence of a bend 47, a sensor measuring an increase in tension, a sensor measuring a decrease in the presence of the bend, or a combination of these. Thus, the system can automatically adjust the deposition rate or the feed rate based on detecting a predetermined trigger event. An example of an active signal includes manually adjusting the deposition rate or the feed rate by providing a transmitted instruction to the system (e.g., an operator using an interface to adjust the system manually).

Figure 4:
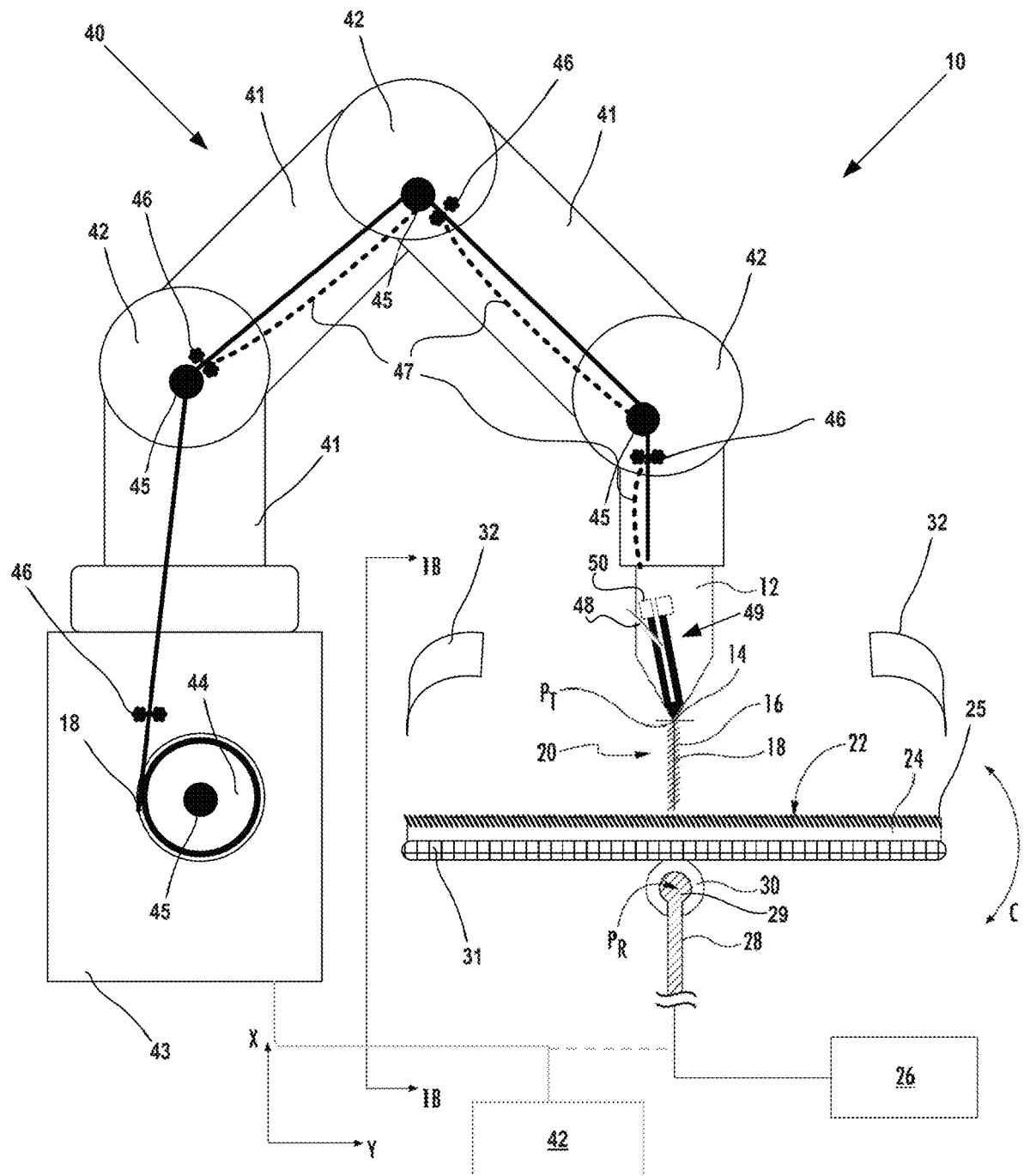
FIG. 4 illustrates an example embodiment of the disclosure depicting a further example system for printing a 3D object.
Figure 8:
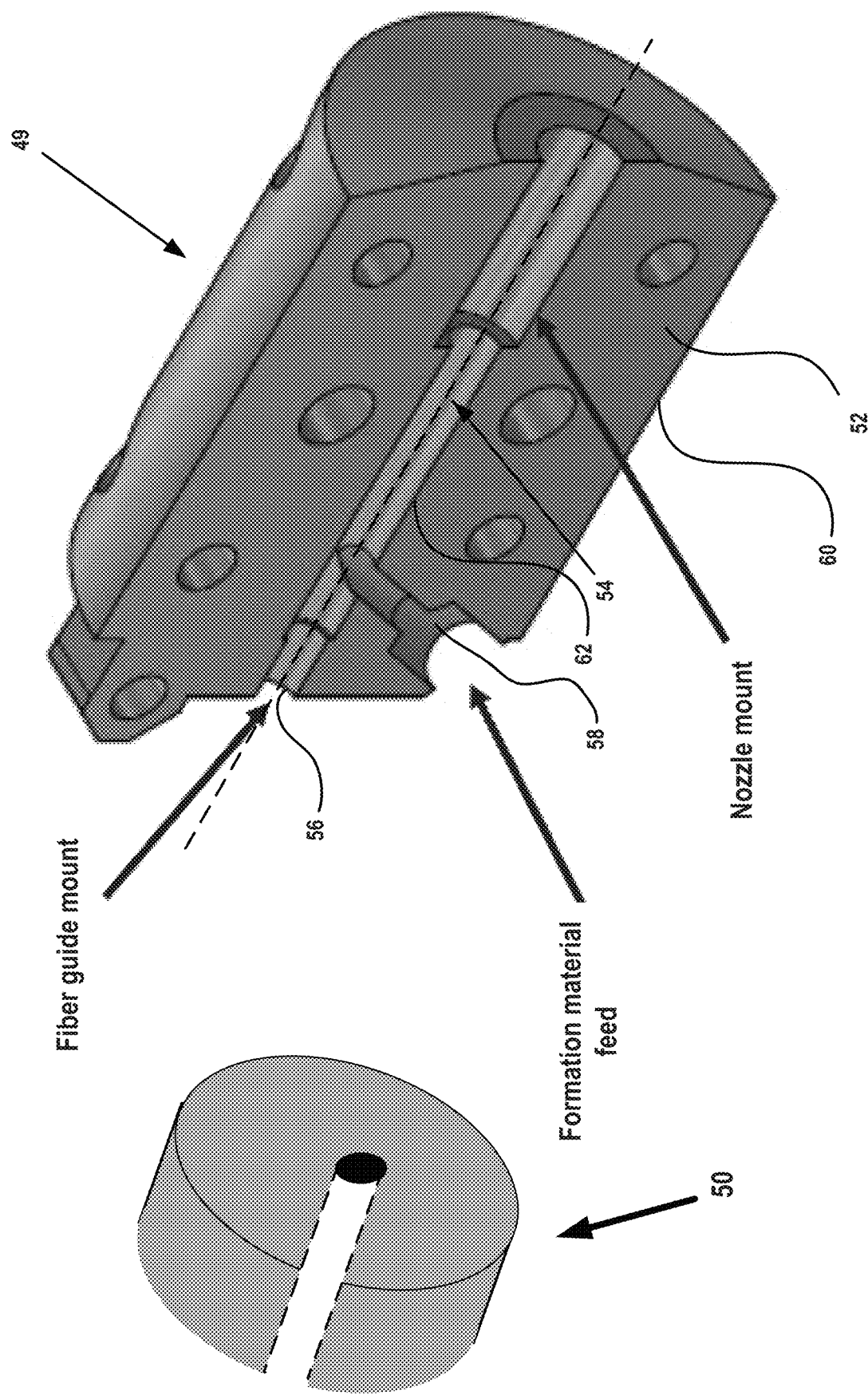
FIG. 8 illustrates an example liquefier that can be included in example embodiment of the disclosure.

FIG. 4 displays another example embodiment of the disclosure that includes a liquefier 49 as part of the print head 12 or in communication with the print head 12, and positioned prior to a nozzle 14 (e.g., an extrusion tip). An example embodiment of the liquefier 49 is shown in FIG. 8. The liquefier 49 includes a shell 52 having two entry points for 3D printing materials (e.g., fibers and formation materials) to enter a void 54 positioned within the shell 52. Generally, the void goes along an axis of the shell 52 allowing the fiber to enter the void 54 at a first entry point 56, contact a formation material 48 within the void 54 and exit the void 54 proximate to the nozzle 14. In some implementations, the shell 52 may have an exterior shape partially defining the cross-sectional shape of the exterior surface 60 and/or a void shape partially defining the cross-sectional shape of the interior surface 62. While many different shapes can be used to define the exterior shape and the void shape (e.g., oval, circle, triangle, quadrilateral, or other polygons), generally heating can be better controlled using cylindrical implementations having substantially circular cross sections. In certain implementations, the cross section need not be constant along the entirety of the shell 52 or the void 54. Thus, embodiments for the liquefier 49 can include tapering which can be used in some implementations to control the flow of the formation material through the liquefier 49.

In certain implementations, a fiber guide 50 can be positioned prior to the first entry point 56, such that as the continuous fiber moves through the system, the continuous fiber enters the fiber guide 50 and passes through the first entry point 56 to enter the void 54 within the liquefier 49. The liquefier 49 can also include a feed line 58 connecting an exterior surface 60 of the liquefier 49 to an interior surface 62, the interior surface partially defining the void 54. In this manner, a formation material 48 such as a polymer may be provided to the system 10 (e.g., by feeding the formation material 48 into the feed line 58) to contact the continuous fiber 18.

In certain implementations, the fiber guide 50 may be replaceable such that the fiber guide 50 can be removed from the liquefier 49 without damaging the liquefier 49 or the fiber guide 50. Using this replaceable design, different fiber guides 50 having varying sizes can be used to control and/or guide fibers and tows having a range of sizes, shapes and compositions to the liquefier and thereon.

In certain implementations, the interior surface 62 of the liquefier 49 can also include a coating. For some embodiments, the coating can have a high thermal stability such that the coating has a degradation temperature of greater than about 450° C. In certain embodiments, the coating can have a degradation temperature of greater than about 600° C. In some embodiments, the coating can have a degradation temperature of greater than about 800° C. Several non-limiting examples of coatings that may be included in embodiment of the disclosure include tungsten disulfide, titanium nitride, or a combination of both. While high-thermal stability is desirable for printing certain thermoplastics, aspects of this disclosure are not limited only to use with high melting point thermoplastics, though implementations of this disclosure may provide advantages when using these materials.

In some implementations, the liquefier may include or may be in communication with a heater configured to control the temperature of any material entering the liquefier. For example, a heating jacket can be positioned to substantially surround the liquefier, the void, the feed line, or a combination thereof. By providing heating to each of these regions, thermal energy can be transported from the heating jacket to material entering the liquefier. By heating the formation material at the liquefier, the formation material 48 and the continuous fiber 18 can combine prior to the nozzle 14, which in some embodiments may include further heating elements.

Figure 5:
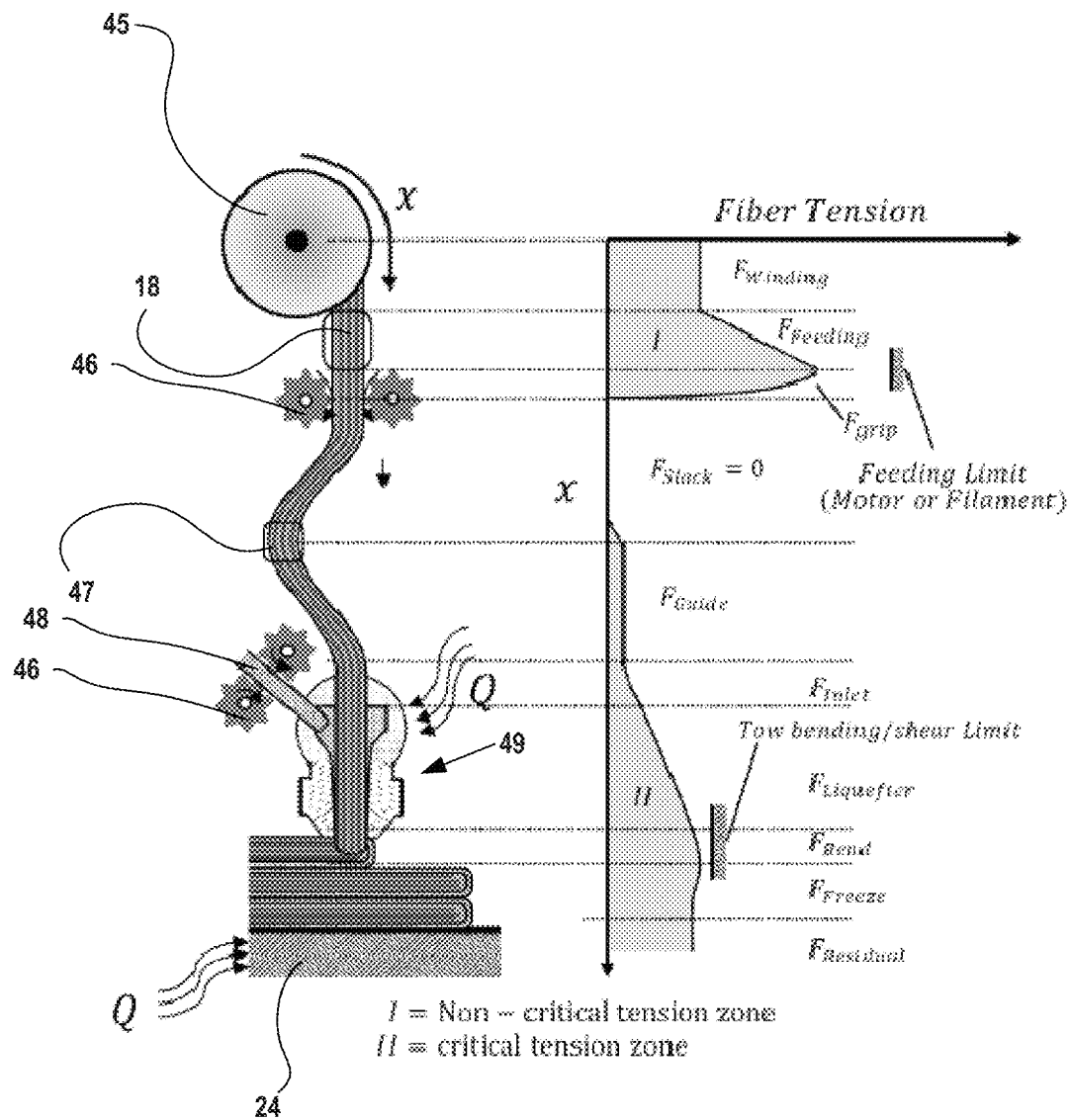
FIG. 5 illustrates an example embodiment of the disclosure depicting aspects of the fiber pathway in relation fiber tension in accordance with certain systems for printing a 3D object.

FIG. 5 illustrates an example system for depositing a composite fiber on a surface. The system shows a reel 45 containing a continuous fiber 18, a fiber pathway, a liquefier 49, and a print bed 24. In FIG. 5, a bend 47 is shown in the fiber pathway prior to the liquefier 49. Additionally, the liquefier 49 is shown to include two entry points, the first allowing the continuous fiber to enter the liquefier and the second allowing a formation material to contact the continuous fiber. While two heat flows are shown, multiple heating elements could be used to achieve each heat flow (i.e., Q). As shown, one heat flow can be transmitted to the liquefier, and a second heat flow can be transmitted to the print bed. In the example implementation shown, material can be deposited and adhere to the print bed partially due to interaction with the coating applied to the print bed. As new material is deposited, the composite fiber can be extruded by aid of mechanical implements (e.g., a roller 46), through pulling force from previously printed material extruded, or any combination thereof. For certain implementations, a higher print speed may be achieved by reducing the tension on the continuous fiber as it passes through the print head (e.g., by inducing a bend in the continuous fiber). An example aspect of reducing the tension on the continuous fiber is that excessive pull between the material being deposited on the print surface and previously deposited material could pull or entrain new material from the print head or liquefier with excessive force, causing the new material to become entrained or otherwise deposit incorrectly. By maintaining lower tension (e.g., by the presence of a bend prior to the print head), it is less likely that the composite fiber exiting the print head can break or otherwise cause damage to the system or the object being formed by the 3D printing system. In this manner, improved printing speeds and more stable system operation can be achieved which may result in reduced printing times and cost savings.

The deposition rate as a function of time may depend on print geometry. If there are many sharp corners in the printed parts, the tension present in the nozzle can "drag" the fiber to the inside of corners, which reduces the length of the fiber needed during feed-in. As such, for certain prints, a tension feed-back system can be used to improve the quality of 3D printed objects. An example method for determining the tension in the fiber can include introducing a bend in the fiber. The displacement of the bend can be directly proportional to the tension in the fiber. For example, if the tension is higher, the bend may be smaller; if the tension is lower, the bend may be larger.

Figure 6:
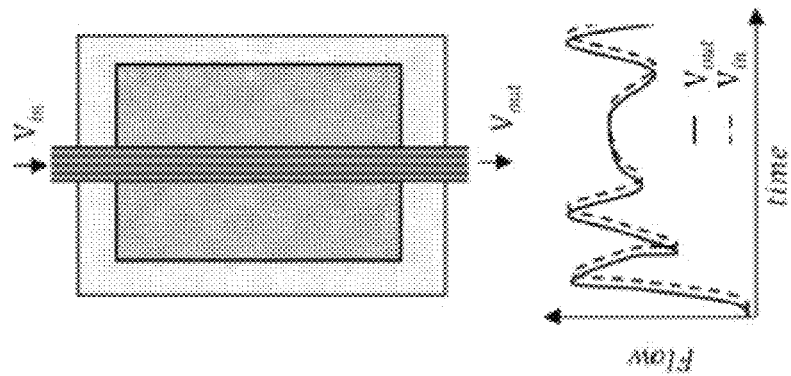
FIG. 6 illustrates an example embodiment of the disclosure depicting aspects of the composite material produced at the nozzle in relation to the feed rate. As shown in the flow versus time plots, when the feed rate going in ($V_{in}$) is greater than the average exit velocity ($V_{out,\ avg}$) the fiber can bunch. With feedback less or no bunching is produced.
Figure 6:
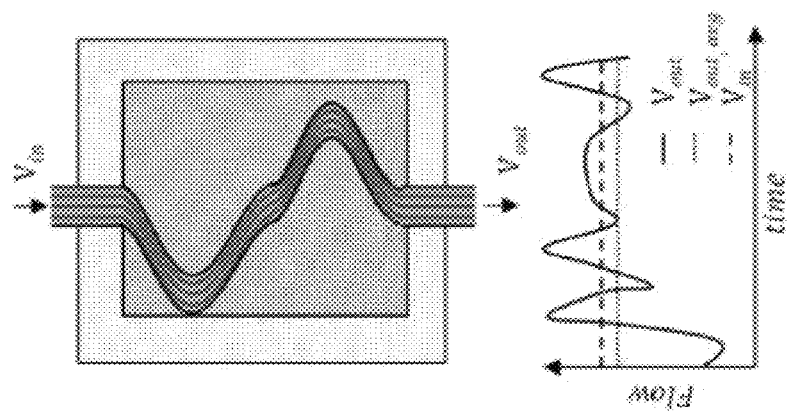
Figure 6:
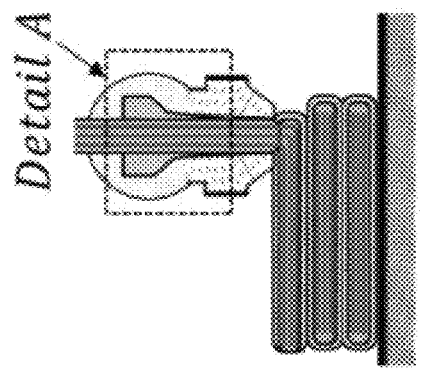

In an example embodiment, the displacement amplitude can be gauged using a slack gauge, which can then feed the displacement back to the rotation speed on the feed motor (e.g., by using the controller to transmit a signal). The rotation speed of the feed motor can be used to adjust the feed rate. If the displacement is high, the feed motor provides less fiber to the system, and the opposite is true of low displacements. Several benefits can be derived from monitoring the presence of a forced bend including: measuring tension, measuring compression, or both. Without this measure of compression, the stiff fiber could be forced into the liquefier, where it can melt and/or deform. Without feedback, the set material feed may be either too high or too low. If the fiber feed is set too low, build-up of tension can fail the print by tearing or shearing material. If the feed is set higher than the average of the consumed fiber, this excessive feeding into the liquefier can bunch up and block the nozzle, which can also lead to a failed print (as shown in FIG. 6). By using sensors that dynamically measure and transmit tension and/or compression data, even though there may be lag between feed and print operations, the material in the liquefier can remain under a constant tension and so little or no bunching occurs.

In certain implementations, one or more additional sensors may be used to monitor forces at the nozzle (e.g., using a force torque sensor). With the presence of a bend in the continuous fiber, the fiber can enter the liquefier at a lower tension. At the liquefier, tension may increase in the fiber as shear-forces from the melted composite material (e.g., a thermoplastic) start to drag along the fiber. Having the fiber inlet angled downwards can reduce this traction and may help the flow to push the fiber down. As the composite fiber passes out of the liquefier and to the nozzle, a rounded 90-degree turn is made to deposit it onto the part. This turn may be smoothened, as a rough or sharp turn can break the fibers. This introduces a second tension limit, which is influenced in part by the tow shear and bending limit. Example images of the turn are shown in FIGS. 7A-7D.

The tension present at the nozzle bend and during the freezing stage of the liquid material will "drag" the fiber bundle close to the nozzle bend and bring it to the top of the deposition, which alleviates some tension in the fiber. An illustration of the turn with both a front and side-view is shown in FIG. 7A. As illustrated by the deposition cross-section, fibers can collect near the top of their respective depositions based on the tension. A second illustration displaying the impact of tension at the nozzle on the distribution of continuous fibers within deposited composite fiber is shown in FIG. 7B. Further, a photograph of a curved wall printed at higher tension is shown in FIG. 7C, and a photograph of a curved wall printed at lower tension is shown in FIG. 7D. As shown in these figures, controlling the tension can allow for printing of more evenly distributed fibers that can result in an improved curvature for deposited material.

For implementations that require depositing material in multiple layers that are in contact with one another. A sensor at the nozzle or elsewhere may be configured to measure the pressure or force applied as a new layer of material is deposited. In these implementations, a pressure suitable for bonding the new layer of material to the prior layer of material may be used to adjust printing parameters to increase or decrease the pressure at the nozzle. For certain thermoplastics, the temperature, time, and pressure during deposition can influence the bonding of a new layer to the prior layer. Thus, aspects of this disclosure may provide additional improvements in print quality that may be especially effective for printing multi-layer 3D printed objects.

Figure 9B:
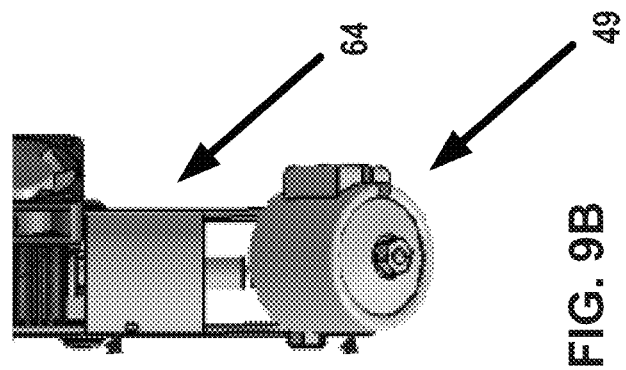
FIGS. 9A and 9B illustrate an example preheater and liquefier combination that can be included in example embodiments of the disclosure.
Figure 9A:
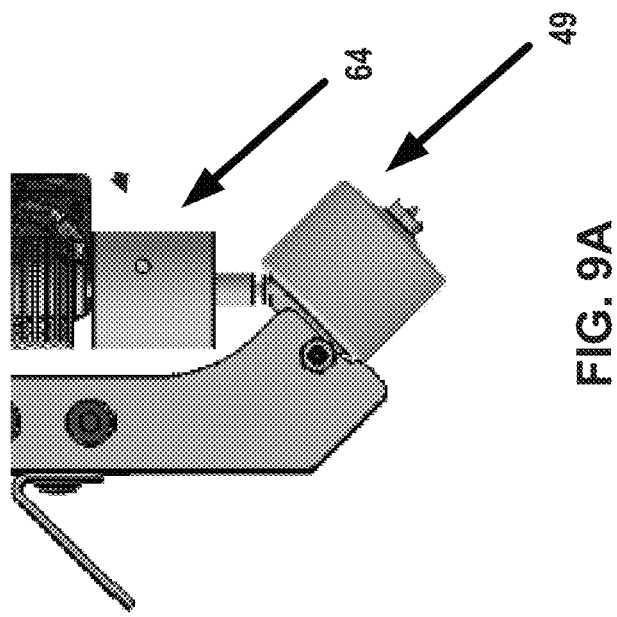

In another example implementation, the 3D printing system can also include a preheater positioned prior to and in communication with the liquefier. An example illustration of the preheater 64 and liquefier 49 is illustrated in FIGS. 9A and 9B. Generally, the preheater 64 can be configured to provide heating to the formation material prior to the formation material entering the liquefier 49. In this manner, the temperature of the formation material can be controlled, which may improve flow of material entering the liquefier 49.

While embodiments of the disclosure may be practiced alone or in combination, it should be understood that the advantages described herein can be synergistic and that further advantages may only be recognized as 3D printing materials and 3D printing systems continue to advance. Additionally, embodiments of 3D printing systems disclosed herein may provide specific advantages for use with heterogeneous materials such as composite fibers, especially for composite fibers that include a high-temperature thermoplastic (e.g., PEI).

EXAMPLE 1

Example 1 discusses various methods and provides exemplary embodiments that may be understood in conjunction with the Drawings and Description provided herein. The materials and conditions described in the example are demonstrative and are not meant to constrain the scope of the disclosure only to the materials and conditions used.

Example Bed Surface Evaluation

The material and adhesion of the print to the bed surface needs to be tuned to acceptable limits: on one hand, the part needs to stick to the surface such that it can be printed and withstand any forces from the full 6+-axis of depositions; but on the other hand, it needs to be loose enough so that it can be removed from the build platform without damaging the part or the build platform. In this research, a combination of existing methods and new methods were assessed to find the best bed surface for CCF-PEI printing. The options were assessed qualitatively on a scale from 1 to 5:
1. No adhesion
2. Lower-strength adhesion
3. Low-strength adhesion (prints may display bed separation)
4. Mid-strength adhesion (allows low-force mechanical removal)
5. High-strength adhesion (may require chemical removal or break force)

The different options are ranked on their adhesion assessment in table 1. Note that items marked with an * are frequently used to build platforms in the 3D printing community. The temperature column indicates the approximate temperature that was found for optimal bed adhesion with that specific configuration. Maximum temperature values listed in the table are approximations to the upper use temperatures. From the different trials, several options emerged for a good quality bed adhesion. Depending on the amount of prints on one platform, the operator may choose to go for one of these options:

3 mm thick Acrylic (PMMA): Good for use for rapid iteration between prints. Parts can be removed without cooling down of the bed. Repeated cycling will warp the acrylic, but it is a low-cost build platform so a single-use may be justified.

Acrylic spray-on Acrylic bed: Excellent adhesion but may warp over time. Removal requires bed to cool down to below 60°.

Acrylic spray-on 3 mm Borosilicate Glass: Best adhesion, flat surface structure, excellent bed heat conduction. Easy removal but requires bed to cool down to below 60°.

Acrylic spray-on Aluminum Silicate: Best adhesion, flat surface structure, excellent bed heat conduction. Easy removal but requires bed to cool down to below 60° C. In these, the acrylic spray used was the Colormaster Crystal Clear variant of from Krylon, and the Borosilicate glass has a thickness of 3 mm.

TABLE 1

Various bed surfaces and the adhesion performance rating

| Material Tested | T ° C. | $T_g$ ° C. | $T_{max}$ ° C. | Performance |
| --- | --- | --- | --- | --- |
| PEI Sheet* | 100 | 217 | 250 | 1 |
| PEI on Painters Tape | 100 | NA | 150 | 1 |
| Silicone sheet | 150 | −125 | 300 | 1 |
| Cellulose Acetate | 110 | 115 | 120 | 1 |
| Borosilicate Glass* | 120 | 820 | 300+ | 1 |
| Capton Tape* | 110 | 385 | 360 | 1 |
| Blue Painters tape* | 100 | NA | 120 | 1 |
| Hairspray (Vinyl) on boros. glass* | 100 | NA | 120 | 2 |
| PPS | 140 | 91 | 230 | 2 |
| Gluestick on borosilicate glass* | 105 | NA | 120 | 2 |
| Glass with Acrylic resin | 110 | 105 | 150 | 3 |
| Acrylic Bed bonded to aluminum sheet | 110 | 105 | 150 | 3 |
| Acrylic (PMMA) | 110 | 105 | 150 | 4 |
| Acrylic spray on Borosilicate Glass | 110 | 105 | 150 | 4 |
| Acrylic spray on Acrylic Bed | 110 | 105 | 150 | 4 |
| Acrylic spray on Aluminum Silicate Bed | 110 | 105 | 150 | 4 |
| PEI Solution on borosilicate glass | 130 | 217 | 250 | 5 |
| Polycarbonate | 120 | 147 | 150 | 5 |
| PETG | 80 | 88 | 200 | 5 |
| Spray on Acrylic on metal sheet | 110 | 105 | 150 | 5 |

While certain embodiments of the disclosed subject matter have been described using specific terms, such description is for illustrative purposes only, and it is to be understood that changes and variations may be made without departing from the spirit or scope of the subject matter.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only and is not intended to limit the invention further described in the appended claims.

The invention claimed is:

1. A system for printing a three-dimensional object comprising:
   a continuous fiber pathway that includes one or more rotors configured to advance a continuous fiber to a first entry point of a print head;
   the print head, comprising a liquefier and a nozzle, the liquefier comprising the first entry point, wherein the first entry point leads to an internal void that extends along an axis of the liquefier, the liquefier comprising a second entry point to a feed line that leads to the internal void;

a preheater positioned prior to and in communication with the second entry point of the liquefier;

a heating jacket surrounding all or a portion of the liquefier;

a print bed comprising a print surface;

a heating and cooling implement configured to adjust a temperature of the print bed;

one or more infra-red heaters configured to transmit focused thermal energy to a material that has been deposited on the print bed;

a controller; and a feeding system having a reel containing the continuous fiber, with the feeding system further comprising at least one sensor configured to sense whether a bend is present in the continuous fiber in the continuous fiber pathway;

wherein the controller receives a signal from the at least one sensor, and adjusts the movement rate of the continuous fiber in the continuous fiber pathway in order to maintain the bend in the continuous fiber in the continuous fiber pathway.

2. The system of claim 1, further comprising an arm, wherein the arm comprises a rotatable joint and a rotatable connection, and wherein the arm is in communication with the print head.

3. The system of claim 2, wherein the arm further supports the feeding system, and wherein the arm includes at least a portion of the continuous fiber pathway.

4. The system of claim 1, wherein the print bed comprises a bed material and a bed coating positioned on the print bed, wherein a surface of the bed coating defines the print surface.

5. The system of claim 4, wherein the bed coating comprises a polymer.

6. The system of claim 5, wherein the polymer comprises: an acrylic, polytetrafluoroethylene, a polyethyleneimine, or a combination thereof.

7. The system of claim 4 wherein the bed material comprises a ceramic.

8. The system of claim 7, wherein the ceramic comprises a silica, an alumina, or a combination thereof.

9. The system of claim 8, wherein the silica comprises borosilicate glass.

10. The system of claim 1, wherein the heating and cooling implement comprises a grid of regions, each of which having an independently controlled temperature.

11. The system of claim 1, wherein the heating and cooling implement provides temperature control to adjust a print bed temperature to between about 0° C. and about 105° C.

12. The system of claim 1, wherein the internal void is surrounded by a surface that comprises tungsten disulfide, titanium nitride, or both.

* * * * *